United States Patent
Kim et al.

(10) Patent No.: US 12,015,193 B2
(45) Date of Patent: Jun. 18, 2024

(54) ELECTRONIC DEVICE INCLUDING ANTENNA

(71) Applicant: Samsung Electronics Co., Ltd., Gyeonggi-do (KR)

(72) Inventors: Dongyeon Kim, Gyeonggi-do (KR); Seongjin Park, Gyeonggi-do (KR); Sehyun Park, Gyeonggi-do (KR); Sumin Yun, Gyeonggi-do (KR); Myunghun Jeong, Gyeonggi-do (KR); Jehun Jong, Gyeonggi-do (KR); Jaehoon Jo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 181 days.

(21) Appl. No.: 17/423,724

(22) PCT Filed: Jan. 7, 2020

(86) PCT No.: PCT/KR2020/000235
§ 371 (c)(1),
(2) Date: Jul. 16, 2021

(87) PCT Pub. No.: WO2020/153629
PCT Pub. Date: Jul. 30, 2020

(65) Prior Publication Data
US 2022/0069442 A1 Mar. 3, 2022

(30) Foreign Application Priority Data
Jan. 23, 2019 (KR) .......... 10-2019-0008601

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 1/40* (2013.01); *H01Q 5/35* (2015.01)

(58) Field of Classification Search
CPC ...... H01Q 13/10; H01Q 13/106; H01Q 13/16; H01Q 13/18; H01Q 1/243; H01Q 5/35; H01Q 1/38; H01Q 1/40
See application file for complete search history.

(56) References Cited

U.S. PATENT DOCUMENTS 6,239,762 B1 * 5/2001 Lier ................ H01Q 21/24
343/846
6,985,123 B2 1/2006 Gottl
(Continued)

FOREIGN PATENT DOCUMENTS

JP 2005-191715 7/2005
JP 2012-156969 8/2012
(Continued)

OTHER PUBLICATIONS

K. Saraswat and A. R. Harish, "Single feed dual polarized crossed slot antenna for tri-band operation," 2018 International Symposium on Antennas and Propagation (ISAP), Busan, Korea (South), 2018, pp. 1-2.*

(Continued)

*Primary Examiner* — David E Lotter
*Assistant Examiner* — Aladdin Abdulbaki
(74) *Attorney, Agent, or Firm* — The Farrell Law Firm, P.C.

(57) ABSTRACT

Disclosed is an electronic device including: a housing including a first plate, a second plate facing away from the first plate, and a side member surrounding a space between the first plate and the second plate, connected to the second plate or integrally formed with the second plate, and includ- (Continued)

ing a first portion comprising a conductive material, wherein the first portion of the side member includes a plurality of through-holes aligned in a first direction substantially parallel to the first plate and a non-conductive material inside the through-holes; a structure disposed inside the space to face the through-holes and including at least one conductive path; and a wireless communication circuit electrically connected to the conductive path. Various other embodiments inferred from the specification are also possible.

11 Claims, 38 Drawing Sheets

(51) Int. Cl.
   *H01Q 1/40* (2006.01)
   *H01Q 5/35* (2015.01)

(56) References Cited

U.S. PATENT DOCUMENTS

| | | | |
|---|---|---|---|
| 9,755,306 B1* | 9/2017 | Ogilvie | H01Q 3/30 |
| 9,800,396 B1* | 10/2017 | Kuo | H01Q 3/46 |
| 9,997,844 B2 | 6/2018 | Lilja | |
| 10,665,926 B2 | 5/2020 | Kim et al. | |
| 11,223,102 B2 | 1/2022 | Jeon | |
| 2004/0051677 A1 | 3/2004 | Gottl | |
| 2009/0322621 A1* | 12/2009 | Inanoglu | H04B 7/10 343/702 |
| 2010/0171675 A1 | 7/2010 | Borja et al. | |
| 2017/0149119 A1 | 5/2017 | Wang et al. | |
| 2018/0048074 A1 | 2/2018 | Lilja | |
| 2018/0294576 A1* | 10/2018 | Niakan | H01Q 1/2258 |
| 2018/0358686 A1* | 12/2018 | Park | H01Q 21/08 |

FOREIGN PATENT DOCUMENTS

| | | |
|---|---|---|
| JP | 2018-056772 | 4/2018 |
| KR | 10-2004-0041087 | 5/2004 |
| KR | 10-2004-0089902 | 10/2004 |
| KR | 10-2011-0052899 | 5/2011 |
| KR | 1020170037464 | 4/2017 |
| KR | 101859762 | 6/2018 |
| KR | 10-2018-0134528 | 12/2018 |
| KR | 1020180130700 | 12/2018 |

OTHER PUBLICATIONS

Y. Chen and R. G. Vaughan, "Crossed slot antenna with simple feed for high polarization isolation," 2013 IEEE Antennas and Propagation Society International Symposium (APSURSI), Orlando, FL, USA, 2013, pp. 650-651, doi: 10.1109/APS.2013.6710985.*
PCT/ISA/210 Search Report issued on PCT/KR2020/000235, dated Apr. 24, 2020, pp. 5.
PCT/ISA/237 Written Opinion issued on PCT/KR2020/000235, dated Apr. 24, 2020, pp. 5.
Korean Office Action dated Feb. 1, 2023 issued in counterpart application No. 10-2019-0008601, 18 pages.
Korean Office Action dated Aug. 23, 2023 issued in counterpart application No. 10-2019-0008601, 10 pages.

* cited by examiner

ELECTRONIC DEVICE INCLUDING ANTENNA

PRIORITY

This application is a National Phase Entry of PCT International Application No. PCT/KR2020/000235, which was filed on Jan. 7, 2020, and claims priority to Korean Patent Application No. 10-2019-0008601, which was filed on Jan. 23, 2019, the entire content of each of which is incorporated herein by reference.

TECHNICAL FIELD

Embodiment of the disclosure relate to a technology for implementing an antenna.

BACKGROUND ART

As mobile communication technologies develop, an electronic device that is equipped with an antenna is being widely supplied. The electronic device may transmit and/or receive a radio frequency (RF) signal including a voice signal or data (e.g., a message, a photo, a video, a music file, or a game) by using the antenna.

Meanwhile, nowadays, the electronic device may perform $5^{th}$ generation communication by using a millimeter wave.

DISCLOSURE

Technical Problem

In an electronic device, in the case where a side member of a housing is formed of a metal frame, the metal frame may cause distortion when a signal is radiated toward a side surface. To allow a signal to be radiated from an antenna without the distortion, a side member corresponding to a portion of the housing, at which a radiator is disposed, may be formed of a nonmetal material.

Also, the electronic device may implement dual linear polarization by using the radiator of the antenna. Also, a structure of a feeding part may become complicated to generate the dual linear polarization. In the case where it is not easy to install the feeding part for generating the dual linear polarization within the antenna, the radiator may not be easy to generate the dual linear polarization.

Embodiments of the disclosure provide an electronic device capable of securing the performance of radiation while maintaining a side member around an antenna with a metal.

Technical Solution

According to an embodiment of the disclosure, an electronic device may include a housing that includes a first plate, a second plate facing away from the first plate, and a side member surrounding a space between the first plate and the second plate, connected with the second plate or integrally formed with the second plate, and including a first portion including a conductive material, wherein the first portion of the side member includes a plurality of through-holes arranged in a first direction substantially parallel to the first plate, and a non-conductive material in the through-holes, a structure that is disposed in the space so as to face the through-holes and includes at least one conductive path, and a wireless communication circuit electrically connected with the conductive path.

According to another embodiment of the disclosure, an electronic device may include a housing that including a side member, a radiator that is formed at a first portion of the side member, the first portion including a conductive material, and a plurality of feeding parts that feed the radiator. The radiator may include a plurality of through-holes disposed in a slot form, and a non-conductive material disposed in the through-holes. Each of the plurality of feeding parts may include a plurality of conductive paths, and at least two conductive paths among the plurality of conductive paths may be disposed to partially overlap the same through-hole.

According to another embodiment of the disclosure, an electronic device may include a housing that includes a first plate, a second plate facing away from the first plate, and a side member surrounding a space between the first plate and the second plate, and is connected with the second plate or is integrally formed with the second plate, and a printed circuit board that is disposed in the space. The housing may include a first portion including a conductive material. The first portion may include a plurality of through-holes, and at least one conductive path disposed to face the through-holes. The conductive path may include a first path facing the plurality of through-holes, a second path, and a third path which are branched and extended from the first path and at least partially overlapping the plurality of through-holes. The first path may be fed from a feeding part included in the printed circuit board. The second path and the third path may feed the plurality of through-holes.

Advantageous Effects

According to embodiments of the disclosure, radiation performance of a millimeter wave may be secured while maintaining a side member around a radiator of the antenna with metal by forming an antenna at a side member of a housing formed of a metal frame.

Also, according to embodiments of the disclosure, the efficiency of mounting may be improved by generating a dual linear polarization, with a feeding part disposed within an antenna.

Besides, a variety of effects directly or indirectly understood through this disclosure may be provided.

With regard to description of drawings, the same or similar components will be marked by the same or similar reference signs.

MODE FOR INVENTION

Hereinafter, various embodiments of the disclosure may be described with reference to accompanying drawings. However, those of ordinary skill in the art will recognize that modification, equivalent, and/or alternative on various embodiments described herein can be variously made without departing from the scope and spirit of the disclosure.

Figure 1:
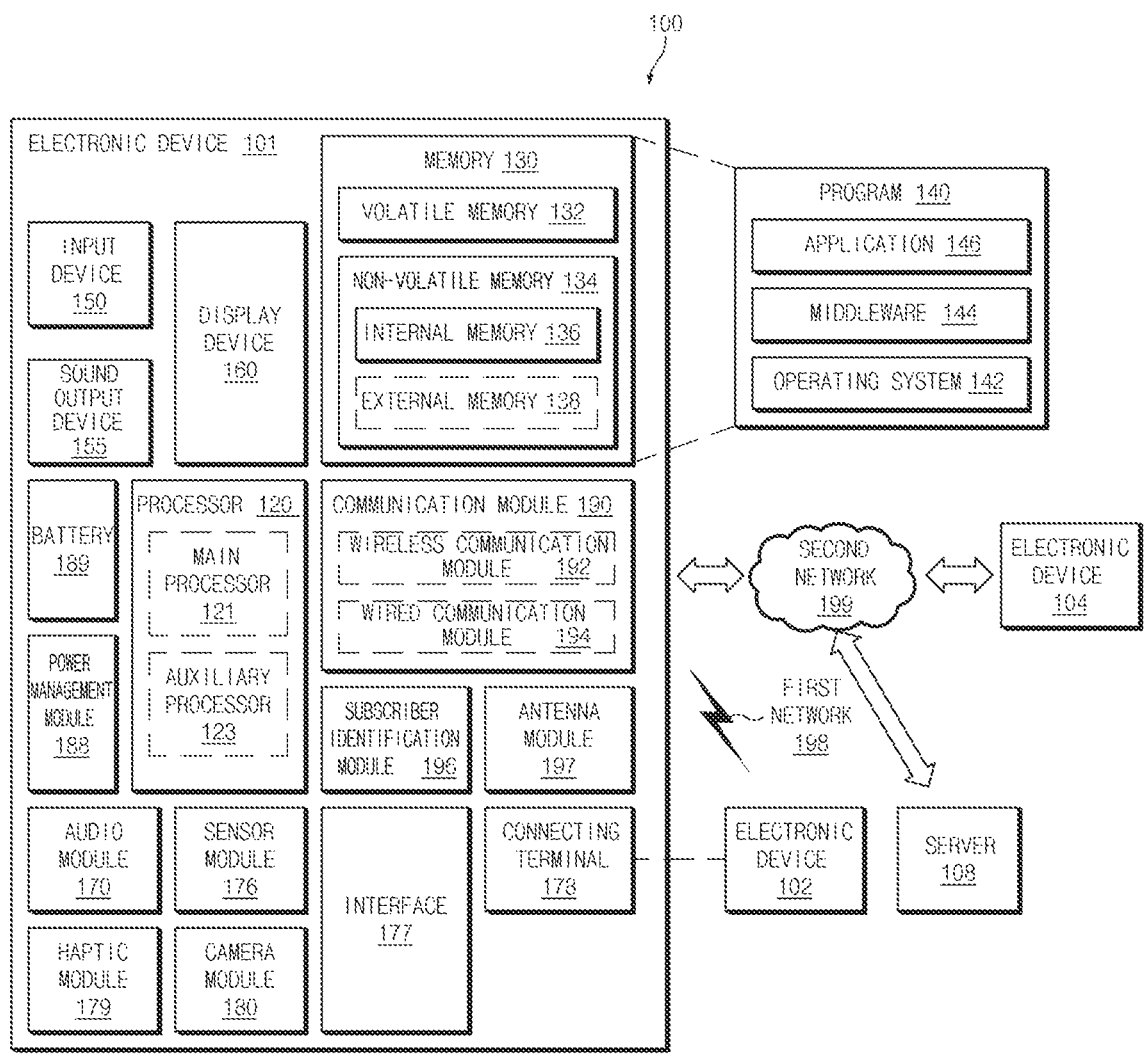
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
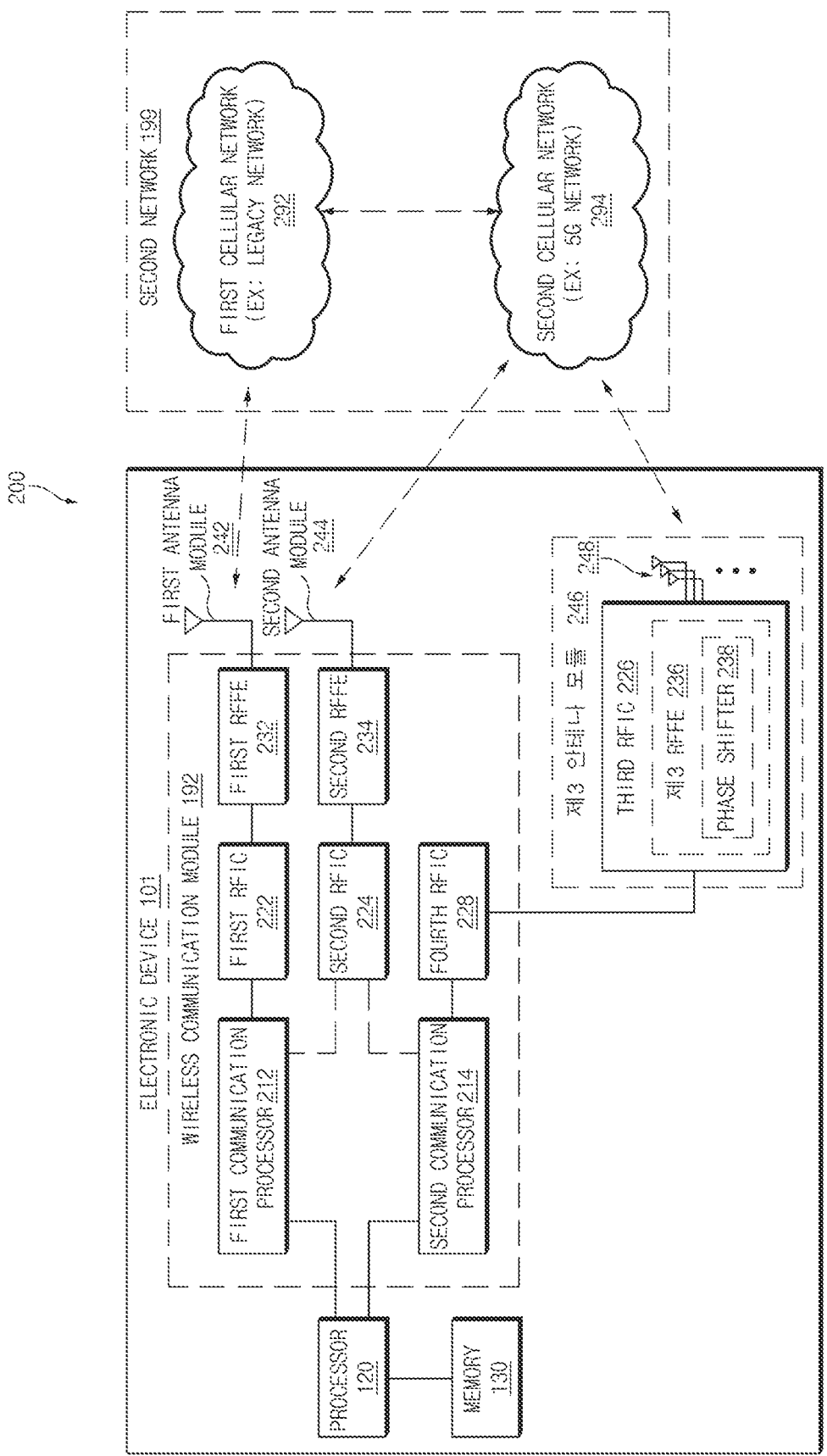
FIG. 2 is a block diagram of an electronic device for supporting legacy network communication and 5G network communication, according to various embodiments.

FIG. 2 is a block diagram 200 of the electronic device 101 for supporting legacy network communication and 5G network communication, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component of the components illustrated in FIG. 1, and the network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292 and may support legacy network communication over the established communication channel. According to various embodiments, the first network may be a legacy network including a 2G, 3G, 4G, and/or long term evolution (LTE) network. The second communication processor 214 may establish a communication channel corresponding to a specified band (e.g., approximately 6 GHz to approximately 100 GHz) of bands to be used for wireless communication with the second network 294 and may support the 5G network communication over the established communication channel. According to various embodiments, the second network 294 may be a 5G network defined in the 3GPP. Additionally, according to an embodiment, the first communication processor 212 or the second communication processor 214 may establish a communication channel for a specified band (e.g., approximately 6 GHz or lower) of the bands to be used for wireless communication with the second network 294 and may support 5G network communication through the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the auxiliary processor 123 of FIG. 1, or the communication module 190 of FIG. 1.

In the case of transmitting a signal, the first RFIC 222 may convert a baseband signal generated by the first communication processor 212 into a radio frequency (RF) signal of approximately 700 MHz to approximately 3 GHz that is used in the first network 292 (e.g., a legacy network). In the case of receiving a signal, an RF signal may be obtained from the first network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second network 294 (e.g., a 5G network). In the case of receiving a signal, a 5G Sub6 RF signal may be obtained from the second network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second network 294 (e.g., a 5G network). In the case of receiving a signal, a 5G Above6 RF signal may be obtained from the second network 294 (e.g., a 5G network) through an antenna (e.g., the antenna 248) and may be pre-processed through a third RFFE 236. The third RFIC 226 may convert the pre-processed 5G Above6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., approximately 9 GHz to approximately 11 GHz) and may provide the IF signal to the third RFIC 226. The third RFIC 226 may convert the IF signal into a 5G Above6 RF signal. In the case of receiving a signal, a 5G Above6 RF signal may be received from the second network 294 (e.g., a 5G network) through an antenna (e.g., the third antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as a part of a single package or a single chip. According to an embodiment, the first RFFE 232 and the second RFFE 234 may be implemented as a part of a single package or a single chip. According to an embodiment, at least one of the first antenna module 242 or the second antenna module 244 may be omitted or may be combined with any other antenna module to process RF signals in a plurality of bands corresponding thereto.

According to an embodiment, the third RFIC 226 and the antenna 248 may be disposed at the same substrate to form a third antenna module 246. For example, the wireless communication module 192 or the processor 120 may be disposed on a first substrate (e.g., a main PCB). In this case, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array to be used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., approximately 6 GHz to approximately 60 GHz) used for 5G network communication from being lost (or attenuated) due to the transmission line. As such, the electronic device 101 may improve the quality or speed of communication with the second network 294 (e.g., a 5G network).

The second network 294 (e.g., a 5G network) may be used independently of the first network 292 (e.g., a legacy network) (e.g., this scheme being called "stand-alone (SA)") or may be used in connection with the first network 292 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., an Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3A:
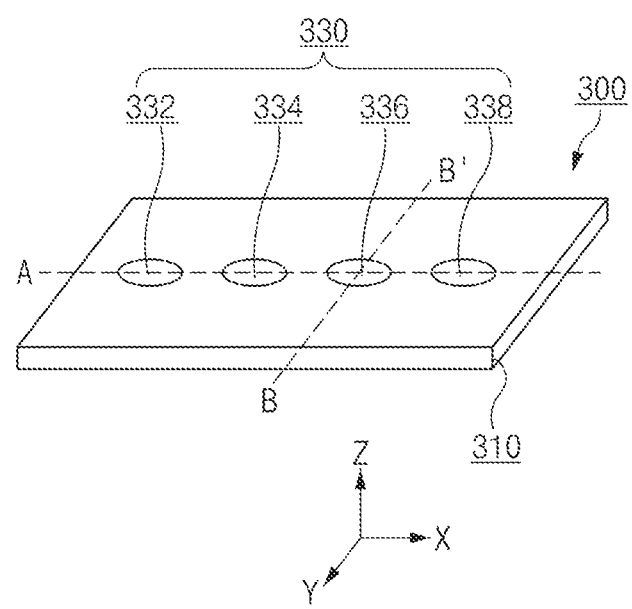
FIGS. 3A to 3C are diagrams illustrating a third antenna module described with reference to FIG. 2.
Figure 3B:
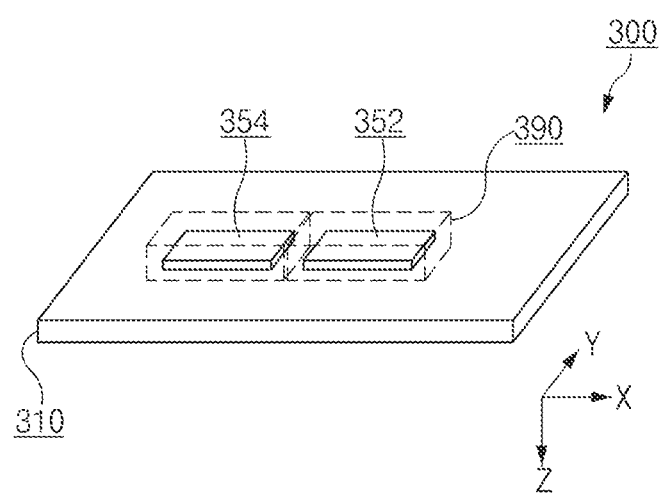
Figure 3C:
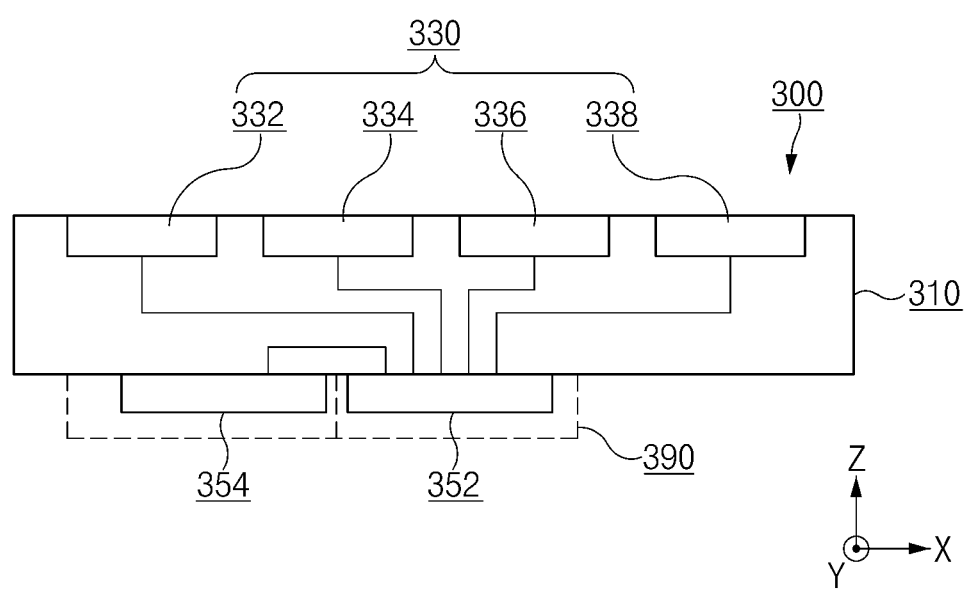

FIGS. 3A to 3C illustrates an embodiment of the third antenna module 246 described with reference to FIG. 2, for example. 3A is a perspective view of the third antenna module 246 when viewed from one side, and FIG. 3B is a perspective view of the third antenna module 246 when viewed from another side. FIG. 3C is a cross-sectional view of the third antenna module 246 taken along line A-A'.

Referring to FIGS. 3A to 3C, in an embodiment, the third antenna module 246 may include a printed circuit board 310, an antenna array 330, a radio frequency integrate circuit (RFIC) 352, a power manage integrated circuit (PMIC) 354, and a module interface. Selectively, the third antenna module 246 may further include a shielding member 390. In various embodiments, at least one of the above components may be omitted, or at least two of the components may be integrally formed.

The printed circuit board 310 may include a plurality of conductive layers and a plurality of non-conductive layers, and the conductive layers and the non-conductive layers may be alternately stacked. The printed circuit board 310 may provide an electrical connection between the printed circuit board 310 and/or various electronic components disposed on the outside by using wires formed in the conductive layers and conductive vias.

The antenna array 330 (e.g., 248 of FIG. 2) may include a plurality of antenna elements 332, 334, 336, and 338 disposed to form a directional beam. The antenna elements may be formed on a first surface of the printed circuit board 310 as illustrated. According to various embodiments, the antenna array 330 may be formed within the printed circuit board 310. According to embodiments, the antenna array 330 may include a plurality of antenna arrays (e.g., a dipole antenna array and/or a patch antenna array), of which shapes or kinds are identical or different.

The RFIC 352 (e.g., the third RFIC 226 of FIG. 2) may be disposed in another region (e.g., on a second surface facing away from the first surface) of the printed circuit board 310, which is spaced apart from the antenna array 330. The RFIC 352 may be configured to process a signal in the selected frequency band, which is transmitted/received through the antenna array 330. According to an embodiment, in the case of transmitting a signal, the RFIC 352 may convert a baseband signal obtained from a communication processor (not illustrated) into an RF signal in a specified band. In the case of receiving a signal, the RFIC 352 may convert an RF signal received through the antenna array 330 into a baseband signal and may provide the baseband signal to the communication processor.

According to another embodiment, in the case of transmitting a signal, the RFIC 352 may up-convert an IF signal (e.g., approximately 9 GHz to approximately 11 GHz) obtained from an intermediate frequency integrated circuit (IFIC) (e.g., the fourth RFIC 228 of FIG. 2) into an RF signal. In the case of receiving a signal, the RFIC 352 may down-convert an RF signal obtained through the antenna array 330 into an IF signal and may provide the IF signal to the IFIC.

The PMIC 354 may be disposed in another region (e.g., on the second surface) of the printed circuit board 310, which is spaced from the antenna array. The PMIC may be supplied with a voltage from a main PCB (not illustrated) and may provide a power necessary for various components (e.g., the RFIC 352) on an antenna module.

The shielding member 390 may be disposed at a portion (e.g., on the second surface) of the printed circuit board 310 such that at least one of the RFIC 352 or the PMIC 354 is electromagnetically shielded. According to an embodiment, the shielding member 390 may include a shield can.

Although not illustrated in drawings, in various embodiments, the third antenna module 246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 352 and/or the PMIC 354 of the third antenna module 246 may be electrically connected with the printed circuit board through the connection member.

Figure 4:
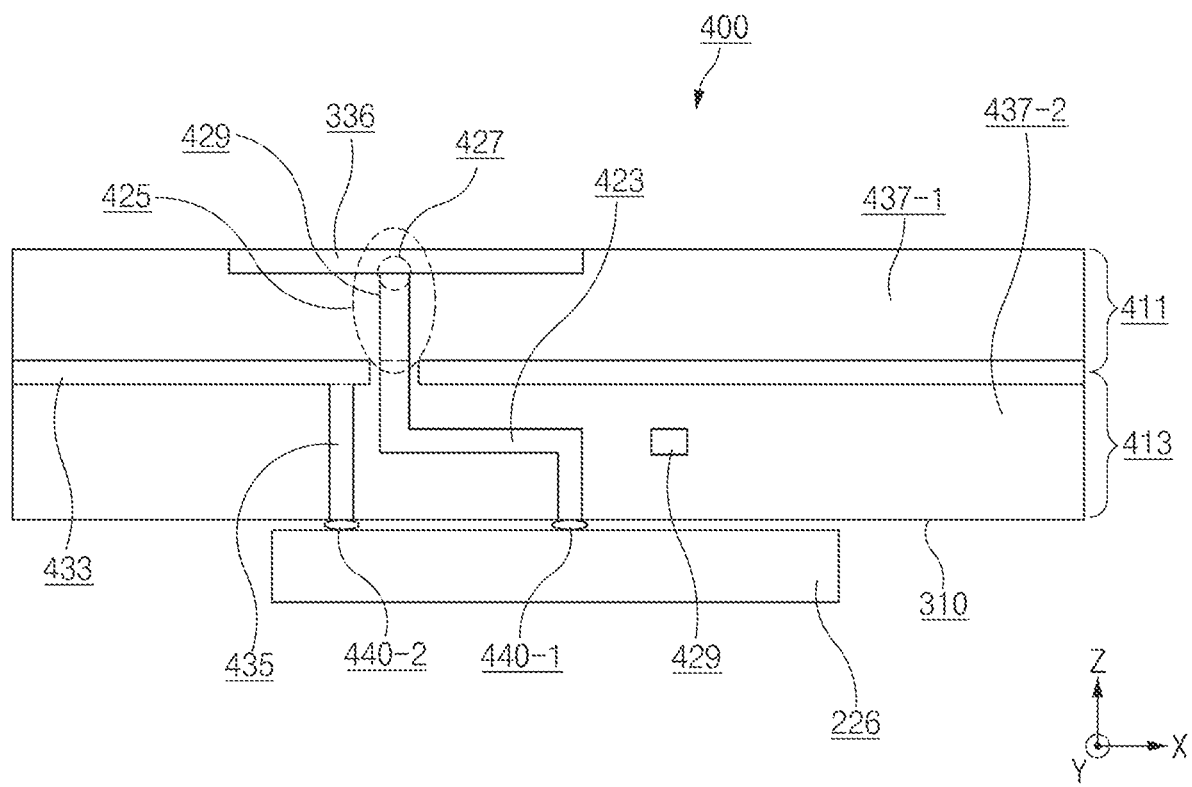
FIG. 4 illustrates a cross-sectional view of a third antenna module taken along line B-B' of FIG. 3A.

FIG. 4 illustrates a cross-sectional view of the third antenna module 246 taken along line B-B' of FIG. 3A. The printed circuit board 310 of the embodiment illustrated may include an antenna layer 411 and a network layer 413.

The antenna layer 411 may include at least one dielectric layer 437-1, and the antenna element 336 and/or a feeding part 425 formed on an outer surface of the dielectric layer or therein. The feeding part 425 may include a feeding point 427 and/or a feeding line 429.

The network layer 413 may include at least one dielectric layer 437-2; and at least one ground layer 433, at least one conductive via 435, a transmission line 423, and/or a signal line 429 formed on an outer surface of the dielectric layer or therein.

In addition, in the embodiment illustrated, the third RFIC 226 may be electrically connected with the network layer 413, for example, through first and second connection parts (e.g., solder bumps) 440-1 and 440-2. In other embodiments, various connection structures (e.g., soldering or a ball grid array (BGA)) may be utilized instead of the connection parts 440-1 and 440-2. The third RFIC 226 may be electrically connected with the antenna element 336 through the first connection part 440-1, the transmission line 423, and the feeding part 425. Also, the third RFIC 226 may be electrically connected with the ground layer 433 through the second connection part 440-2 and the conductive via 435. Although not illustrated in drawings, the third RFIC 226 may also be electrically connected with the above-described module interface through the signal line 429.

Figure 5A:
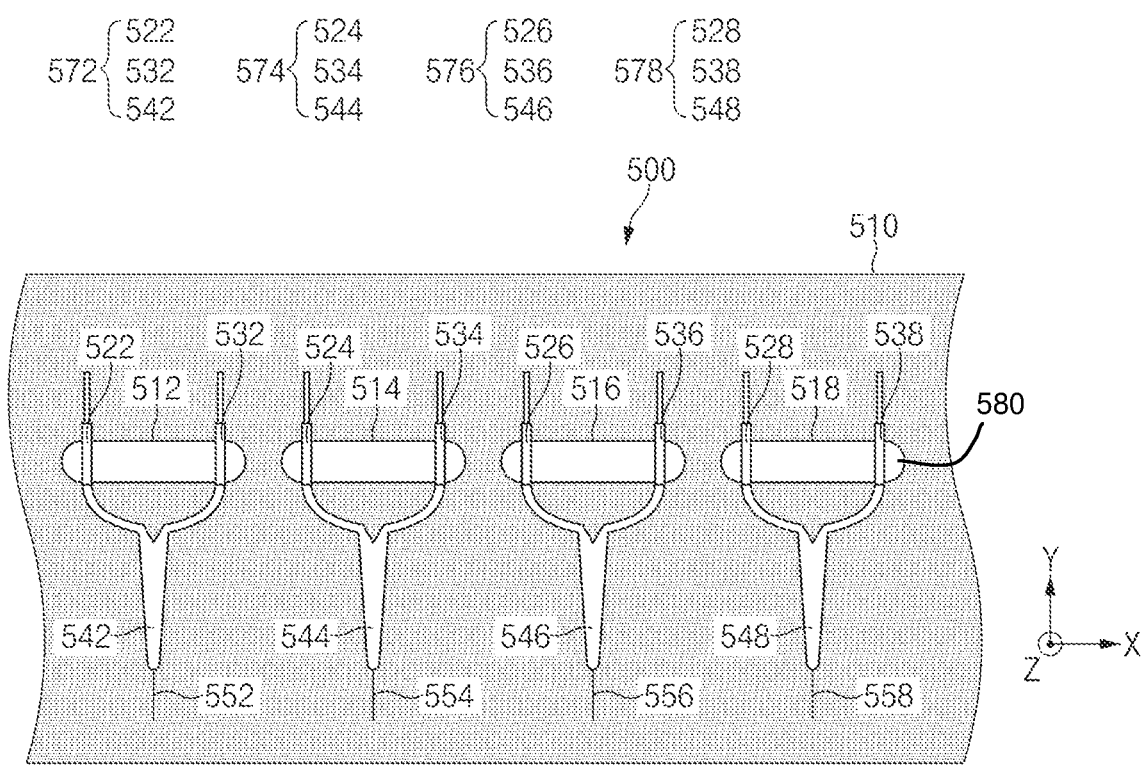
FIG. 5A is a view illustrating through-holes and a plurality of conductive paths, according to an embodiment.
Figure 5B:
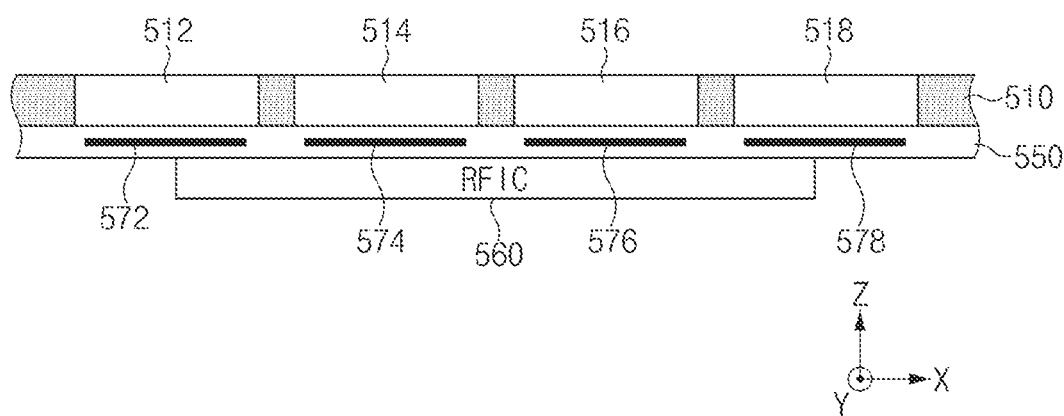
FIG. 5B is a view illustrating a first portion, a substrate including a plurality of feeding parts, and an RFIC, according to an embodiment.
Figure 5C:
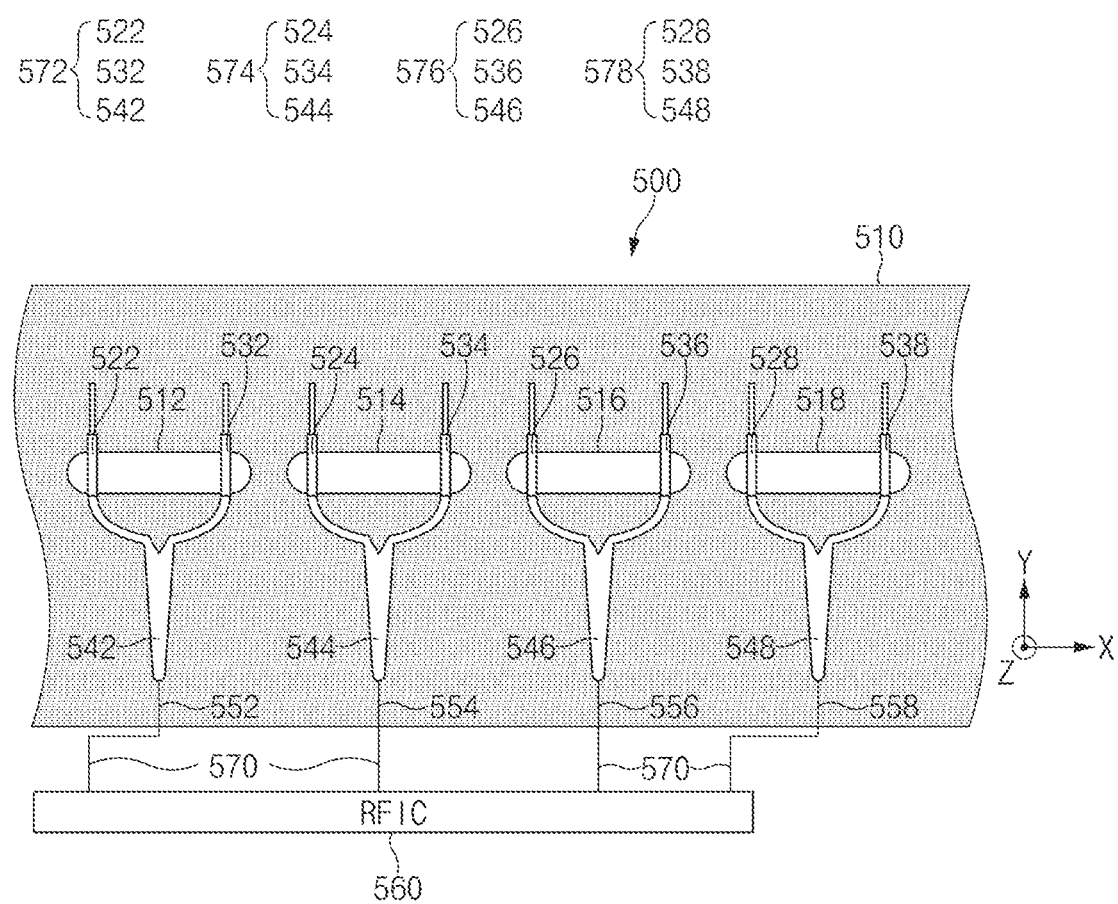
FIG. 5C is a view illustrating a transmission line connected with connection parts of conductive paths and an RFIC, according to an embodiment.

FIG. 5A is a view illustrating through-holes 512, 514, 516, and 518 and a plurality of conductive paths 522, 524, 526, 528, 532, 534, 536, 538, 542, 544, 546, and 548, according to an embodiment. FIG. 5B is a view illustrating a first portion 510, a substrate 550 including a plurality of feeding parts 572, 574, 576, and 578, and an RFIC 560. FIG. 5C is a view illustrating a transmission line 570 connected with connection parts 552, 554, 556, and 558 of the conductive paths 542, 544, 546, and 548 and the RFIC 560, according to an embodiment.

In an embodiment, the first portion 510 may be at least a portion of a side member surrounding a space between a first plate and a second plate of a housing. The first portion 510 may include a conductive material. The plurality of through-holes 512, 514, 516, and 518 or slots may be formed at the first portion 510. In the specification, each of the plurality of through-holes 512, 514, 516, and 518 may be referred to as a "slot".

In an embodiment, the first feeding part 572 may be formed by using the plurality of conductive paths 522, 532, and 542. The second feeding part 574 may be formed by using the plurality of conductive paths 524, 534, and 544. The third feeding part 576 may be formed by using the plurality of conductive paths 526, 536, and 546. The fourth feeding part 578 may be formed by using the plurality of conductive paths 528, 538, and 548.

In an embodiment, FIG. 5A is a top view of an antenna structure 500 including the through-holes 512, 514, 516, and 518 and the plurality of conductive paths 522, 524, 526, 528, 532, 534, 536, 538, 542, 544, 546, and 548. FIG. 5B is a side view of the antenna structure 500 that includes the first portion 510, the substrate 550 including the plurality of feeding parts 572, 574, 576, and 578, and the RFIC 560. In the specification, the antenna structure 500 may be referred to as a "structure 500".

In an embodiment, the plurality of through-holes 512, 514, 516, and 518 or slots may be arranged in a first direction. For example, the first direction may be a direction parallel to an edge of one side of the structure 500. For example, in the case where the structure 500 is in the shape of a rectangle, the first direction may be an X-axis direction that is parallel to an edge of a longer side in the structure 500. An example in which the first to fourth through-holes 512, 514, 516, and 518 are disposed on the structure 500 and the plurality of through-holes 512, 514, 516, and 518 are disposed as much as 4 is illustrated in FIG. 5A. However, the disclosure is not limited thereto. For example, the number of through-holes 512, 514, 516, and 518 disposed on the structure 500 may be more or less than 4.

In an embodiment, the plurality of through-holes 512, 514, 516, and 518 or slots may be formed to penetrate the first portion 510. An example in which the plurality of through-holes 512, 514, 516, and 518 penetrate the whole of the first portion 510 is illustrated in FIG. 513. However, the disclosure is not limited thereto. The plurality of through-holes 512, 514, 516, and 518 may at least partially penetrate the first portion 510. The plurality of through-holes 512, 514, 516, and 518 may be an empty space, but the disclosure is not limited thereto. For example, a penetrated region may be a non-conductive region in terms of an RF signal. The plurality of through-holes 512, 514, 516, and 518 may be filled with a dielectric 580 whose conductivity is low. The plurality of through-holes 512, 514, 516, and 518 implemented at the first portion 510 may transmit and/or receive an RF signal.

In an embodiment, at least a part of the plurality of conductive paths 522, 524, 526, 528, 532, 534, 536, 538, 542, 544, 546, and 548 may be disposed on the plurality of through-holes 512, 514, 516, and 518. In an embodiment, at least a part of the plurality of conductive paths 522, 524, 526, 528, 532, 534, 536, 538, 542, 544, 546, and 548 may be disposed to face the plurality of through-holes 512, 514, 516, and 518. For example, the plurality of conductive paths 522, 524, 526, 528, 532, 534, 536, 538, 542, 544, 546, and 548 may be disposed to be spaced from the plurality of through-holes 512, 514, 516, and 518 in a Z-axis direction.

In an embodiment, the plurality of conductive paths 522, 524, 526, 528, 532, 534, 536, 538, 542, 544, 546, and 548 may include first to twelfth paths 522, 524, 526, 528, 532, 534, 536, 538, 542, 544, 546, and 548.

In an embodiment, the first to fourth paths 542, 544, 546, and 548 may be disposed on one surface of the structure 500 so as to be adjacent to the plurality of through-holes 512, 514, 516, and 518. The first to fourth paths 542, 544, 546, and 548 may be disposed to face the first portion 510. For example, the first to fourth paths 542, 544, 546, and 548 may be disposed to face the plurality of through-holes 512, 514, 516, and 518 in a second direction different from the first direction. The second direction may be substantially perpendicular to the first direction. For example, the second direction may be a Y-axis direction. The number of first to fourth paths 542, 544, 546, and 548 thus disposed may be equal to the number of through-holes 512, 514, 516, and 518.

In an embodiment, the fifth to eighth paths 522, 524, 526, and 528 may be extended from one ends of the first to fourth paths 542, 544, 546, and 548. The fifth to eighth paths 522, 524, 526, and 528 may be disposed to face the plurality of through-holes 512, 514, 516, and 518. For example, the fifth to eighth paths 522, 524, 526, and 528 may be disposed to extend across the plurality of through-holes 512, 514, 516, and 518 in the second direction. The number of fifth to eighth paths 522, 524, 526, and 528 thus disposed may be equal to the number of through-holes 512, 514, 516, and 518.

In an embodiment, when viewed in the Z-axis direction, portions of the fifth to eighth paths 522, 524, 526, and 528 may overlap the plurality of through-holes 512, 514, 516, and 518. The fifth to eighth paths 522, 524, 526, and 528 may be disposed to be spaced from the plurality of through-holes 512, 514, 516, and 518 in the Z-axis direction.

In an embodiment, the ninth to twelfth paths 532, 534, 536, and 538 may be extended from the one ends of the first to fourth paths 542, 544, 546, and 548. The ninth to twelfth paths 532, 534, 536, and 538 may be extended to be spaced from the fifth to eighth paths 522, 524, 526, and 528. The ninth to twelfth paths 532, 534, 536, and 538 may be disposed to face the plurality of through-holes 512, 514, 516, and 518. For example, the ninth to twelfth paths 532, 534, 536, and 538 may be disposed to extend across the plurality of through-holes 512, 514, 516, and 518 in the second direction. The number of ninth to twelfth paths 532, 534, 536, and 538 thus disposed may be equal to the number of through-holes 512, 514, 516, and 518.

In an embodiment, when viewed in the Z-axis direction, portions of the ninth to twelfth paths 532, 534, 536, and 538 may overlap the plurality of through-holes 512, 514, 516, and 518. The ninth to twelfth paths 532, 534, 536, and 538 may be disposed to be spaced from the plurality of through-holes 512, 514, 516, and 518 in the Z-axis direction.

In an embodiment, the first to fourth paths 542, 544, 546, and 548 may be disposed to be spaced from the plurality of through-holes 512, 514, 516, and 518. The fifth to eighth paths 522, 524, 526, and 528 and the ninth to twelfth paths 532, 534, 536, and 538 may be branched and disposed from the first to fourth paths 542, 544, 546, and 548. The fifth path 522 and the ninth path 532 branched from the first path 542 may be formed to overlap the first through-hole 512.

In an embodiment, the connection parts 552, 554, 556, and 558 may be formed at the first to fourth paths 542, 544, 546, and 548. The connection parts 552, 554, 556, and 558 may be portions that are connected with the first to fourth paths 542, 544, 546, and 548 and have a thickness thinner than that of the first to fourth paths 542, 544, 546, and 548. The connection parts 552, 554, 556, and 558 of the first to fourth paths 542, 544, 546, and 548 may be connected with the RFIC 560 being a wireless communication circuit. For example, as illustrated in FIG. 5C, the connection parts 552, 554, 556, and 558 of the first to fourth paths 542, 544, 546, and 548 may be connected with the RFIC 560 through the transmission line 570 or a via. The connection parts 552, 554, 556, and 558 of the first to fourth paths 542, 544, 546, and 548 may be fed (or may be supplied with a power) from the RFIC 560. The connection parts 552, 554, 556, and 558 of the first to fourth paths 542, 544, 546, and 548 may be connected with the RFIC 560 through the transmission line 570 to transmit and/or receive an mmWave signal. The transmission line 570 may independently connect the connection parts 552, 554, 556, and 558 with the RFIC 560. The transmission line 570 may be implemented at the substrate 550.

In an embodiment, the substrate 550 may include the first to twelfth paths 522, 524, 526, 528, 532, 534, 536, 538, 542, 544, 546, and 548. A non-conductive layer may be disposed between the plurality of through-holes 512, 514, 516, and 518 included in the first portion 510 and the first to twelfth paths 522, 524, 526, 528, 532, 534, 536, 538, 542, 544, 546, and 548. The non-conductive layer included in the substrate 550 may prevent the plurality of through-holes 512, 514, 516, and 518 included in the first portion 510 and the first to twelfth paths 522, 524, 526, 528, 532, 534, 536, 538, 542, 544, 546, and 548 from being short-circuited.

In an embodiment, the fifth path 522 and the ninth path 532 branched from the first path 542 may feed a signal of the same frequency and the same phase to the first through-hole 512 overlapping the fifth path 522 and the ninth path 532. The first through-hole 512 may radiate a fed signal. As such, the structure 500 may transmit and/or receive an RF signal by using the first to fourth through-holes 512, 514, 516, and 518.

Figure 6:
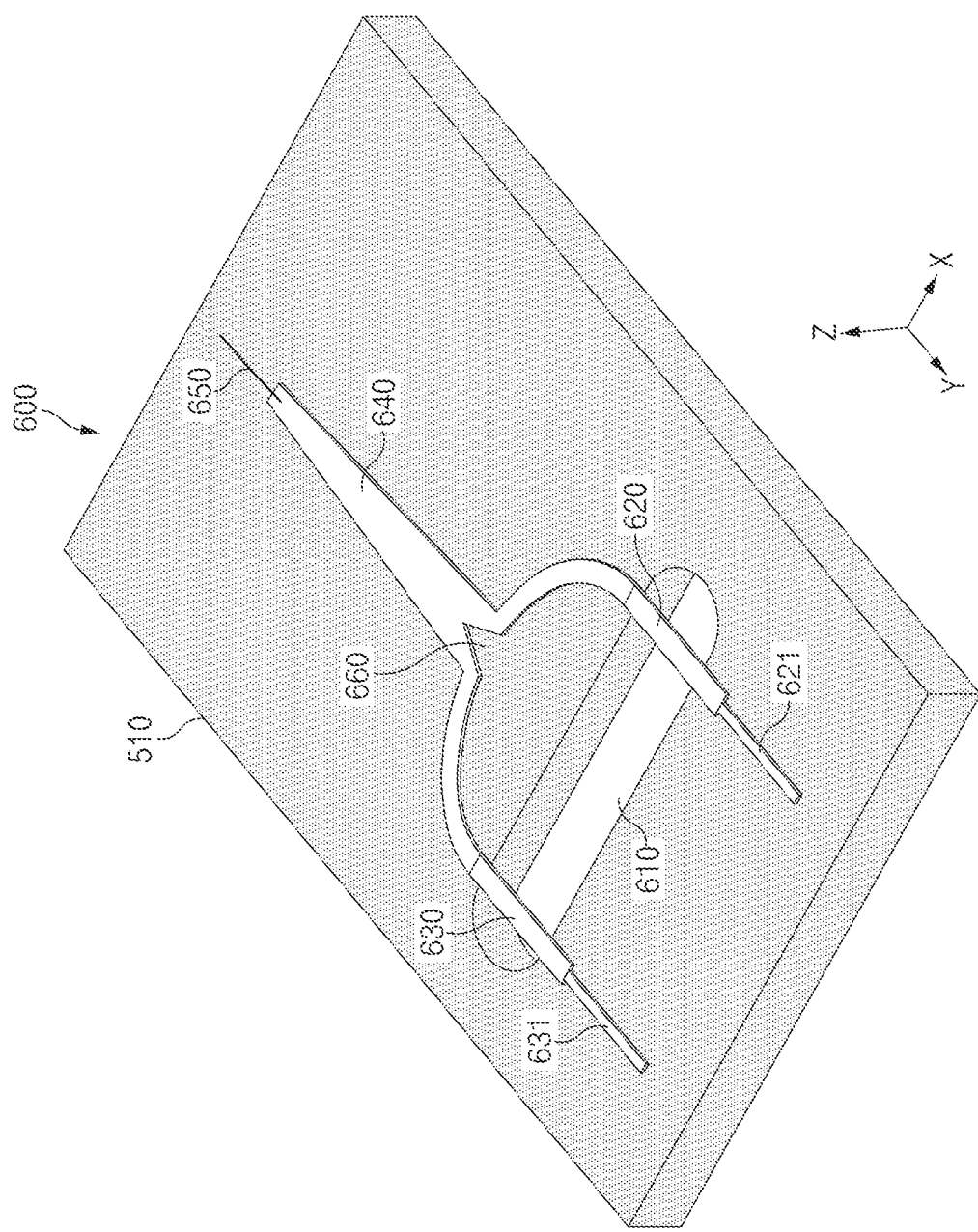
FIG. 6 is a view illustrating a first portion, a through-hole, a first path, a second path, and a third path, according to an embodiment.

FIG. 6 is a view 600 illustrating the first portion 510, a through-hole 610, a first path 640, a second path 620, and a third path 630, according to an embodiment.

In an embodiment, the through-hole 610 (e.g., the first through-hole 512 of FIG. 5A) may penetrate the first portion 510 that is a portion of a side member and is formed of a conductive material. For example, the through-hole 610 may penetrate the first portion 510 in the Z-axis direction. The through-hole 610 may have a slot structure. The electronic device 101 may transmit and/or receive an RF signal of a specified frequency through the through-hole 610. A metal region including the through-hole 610 may be a radiator that radiates the RF signal of the specified frequency. The electronic device 101 may radiate an RF signal through the through-hole 610 or a slot. As such, in a structure including the through-hole 610, a part of the first portion 510, in which a slot is formed at a conductive material and the slot is filled with a nonmetal material, may function as a radiator of the electronic device 101.

In an embodiment, the first path 640 may be disposed to face the through-hole 610. One side of the first path 640 (e.g., one side of the first path 542 of FIG. 5A) may diverge to the second path 620 (e.g., the fifth path 522 of FIG. 5A) and the third path 630 (e.g., the ninth path 532 of FIG. 5A). An opposite end of the first path 640 may be connected with a wireless communication circuit (e.g., the RFIC 560 of FIG. 5B).

In an embodiment, the first path 640 may include a connection part 650. The connection part 650 may be connected with a port of a wireless communication circuit (e.g., the RFIC 560 of FIG. 5C), may be supplied with a signal, and may feed the signal to the through-hole 610. To feed a signal, the connection part 650 of the first path 640 may be implemented with a transmission line of a microstrip or strip form. The connection part 650 of the first path 640 may be connected with an RFIC (e.g., the RFIC 560 of FIG. 5C) through the transmission line (e.g., the transmission line 570 of FIG. 5C) and may transmit and/or receive a signal.

In an embodiment, the second path 620 and the third path 630 may be disposed to pass above the through-hole 610. The second path 620 and the third path 630 may be implemented with two transmission lines that are disposed just above the through-hole 610 or the slot. Each of the second path 620 and the third path 630 may be designed to have a characteristic impedance of about 50Ω. In an embodiment, an open stub 621 and/or 631 that is different in width from the second path 620 and the third path 630 may be connected with the second path 620 and/or the third path 630. The open stubs 621 and 631 may match an input impedance of the through-hole 610 and the second path 620 and the third path 630.

In an embodiment, the second path 620 and the third path 630 may be coupled with the first path 640 on one side thereof. The first path 640 that is integrated to one line may be connected with a port of a wireless communication circuit. For example, the first path 640 may be connected with a port of a wireless communication circuit (e.g., the RFIC 560 of FIG. 5B).

In an embodiment, because the first path 640 has a greater width than a transmission line of 50Ω, the first path 640 may have a characteristic impedance of about 35Ω. For example, the first path 640 may function as a 3 dB T-junction combining a 3 dB power. The first path 640 may function as an impedance transformer that transforms an impedance from about 50Ω to about 35Ω.

In an embodiment, a slit 660 of a triangle form may be disposed at a junction of a transmission line at which the first path 640 is coupled with the second path 620 and the third path 630. The slit 660 may make impedance matching when the first path 640 is coupled with the second path 620 and the third path 630.

Figure 7A:
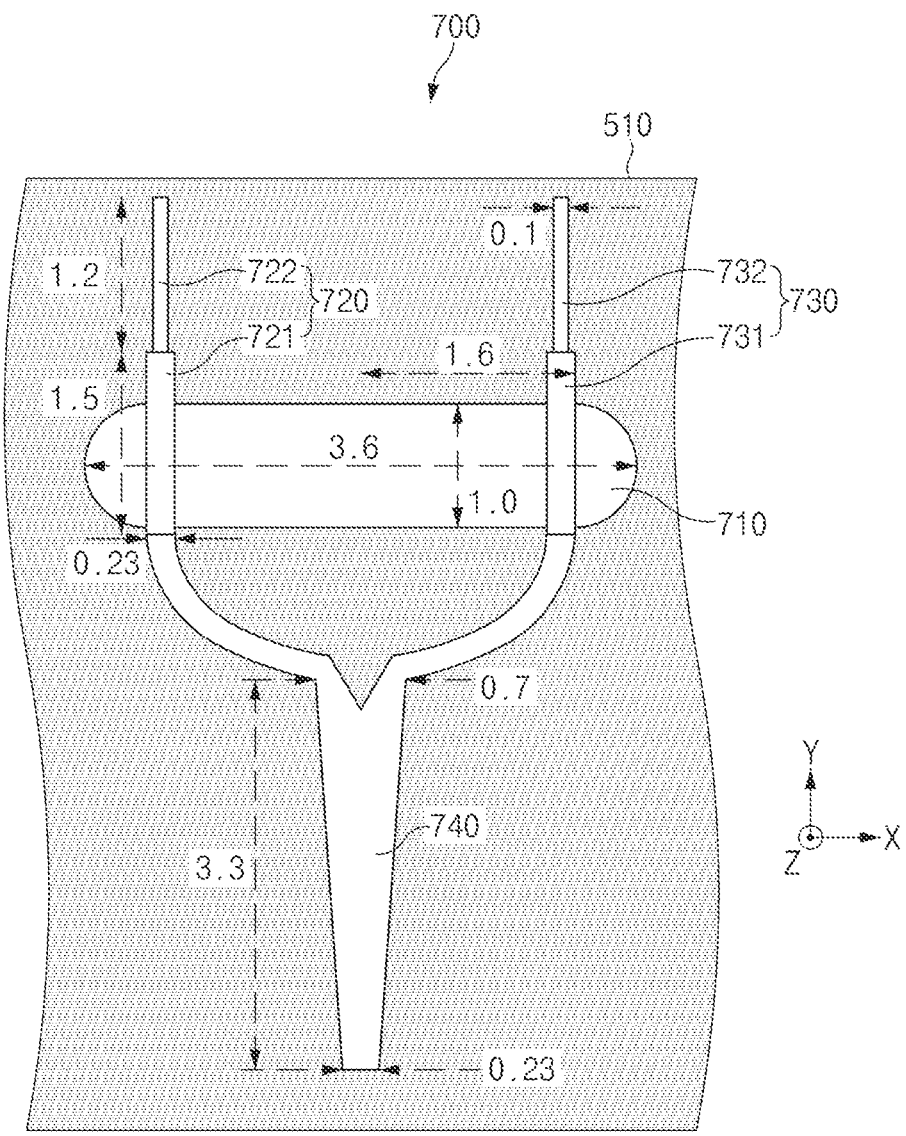
FIG. 7A is a view illustrating a first portion, a through-hole, a first path, a second path, and a third path in detail, according to an embodiment.

FIG. 7A is a view illustrating the first portion 510, a through-hole 710 (e.g., the first through-hole 512 of FIG. 5A), a first path 740 (e.g., the first path 542 of FIG. 5A), a second path 720 (e.g., the fifth path 522 of FIG. 5A), and a third path 730 (e.g., the ninth path 532 of FIG. 5A), according to an embodiment. FIG. 7A may be a top view of a structure 700.

In an embodiment, the through-hole 710 may be formed at the first portion 510. For another example, a non-conductive material may be disposed in the through-hole 710. A relative dielectric constant of the non-conductive material may be, for example, about 3.5.

In an embodiment, a default resonant frequency of a radiator may be set by a length of a slot such as the through-hole 710. For example, a length of the through-hole 710 in the first direction (i.e., X-axis) may be about 3.6 mm, and a length of the through-hole 710 in the second direction (i.e., Y-axis) may be about 1.0 mm. In this case, the through-hole 710 may have a length of about 0.5 λg or more and about 0.6 λg or less at about 28 GHz that is used in 5G communication. "λg" may be defined as a wavelength in waveguide being a wavelength in the through-hole 710.

In an embodiment, the first path 740 may have a line width of about 0.23 mm or more and about 0.7 mm or less in the first direction (i.e., X-axis) and may have a length of about 3.3 mm in the second direction (i.e., Y-axis). For example, as a distance from one side at which the first path 740 is coupled with the second path 720 and the third path 730 decreases, a line width of the first path 740 may increase. The first path 740 may function as an impedance transformer.

In an embodiment, the second path 720 and the third path 730 may include overlapping parts 721 and 731, at least portions of which overlap the through-hole 710 after being branched from the first path 740, and open stubs 722 and 732 (e.g., 621 and 631 of FIG. 6) disposed at portions passing through the through-hole 710. A line width of the overlapping parts 721 and 731 in the first direction (i.e., X-axis) may be about 0.23 mm. A length of the overlapping parts 721 and 731 in the second direction (i.e., Y-axis) may be about 1.5 mm. A line width of the open stubs 722 and 732 in the first direction (i.e., X-axis) may be about 0.1 mm. A length of the open stubs 722 and 732 in the second direction (i.e., Y-axis) may be about 1.2 mm. Also, each of the second path 720 and the third path 730 may be spaced from the center of the through-hole 710 as much as about 1.6 mm. As such, the second path 720 and the third path 730 may be spaced from each other as much as about 3.2 mm.

Figure 7B:
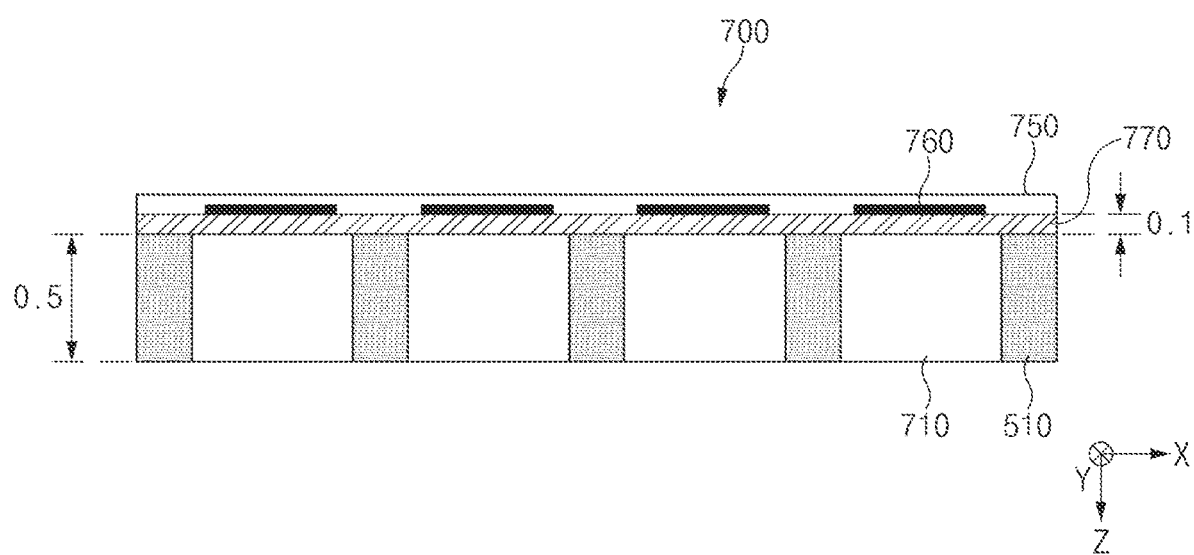
FIG. 7B is a view illustrating a substrate including a first portion and a feeding part in detail, according to an embodiment.

FIG. 7B is a view illustrating a substrate 750 including the first portion 510 and a feeding part 760 in detail, according to an embodiment. FIG. 7B may be a side view of the structure 700. The first portion 510 of FIG. 7B may include through-holes 710. The feeding part 760 of FIG. 7B may include the first path 740, the second path 720, and/or the third path 730.

In an embodiment, the through-holes 710 may be formed at the first portion 510. A thickness of the first portion 510 in a height direction (i.e., Z-axis) may be about 0.5 mm.

In an embodiment, the first path 740 may be connected with the second path 720 and/or the third path 730. The first path 740 may transfer a signal to the second path 720 and/or the third path 730.

In an embodiment, the substrate 750 may include a plurality of feeding parts 760. For example, a conductive layer including the feeding part 760 may be disposed within the substrate 750. The substrate 750 may face one surface of the first portion 510 including the through-hole 710. A dielectric layer 770 formed of a dielectric of a non-conductive characteristic may be included between the feeding part 760 included in the substrate 750 and the first portion 510. A thickness of the dielectric layer 770 in the height direction (i.e., Z-axis) may be about 0.1 mm. For another example, a gap of about 0.1 mm may be formed between the feeding part 760 and the first portion 510.

Figure 8A:
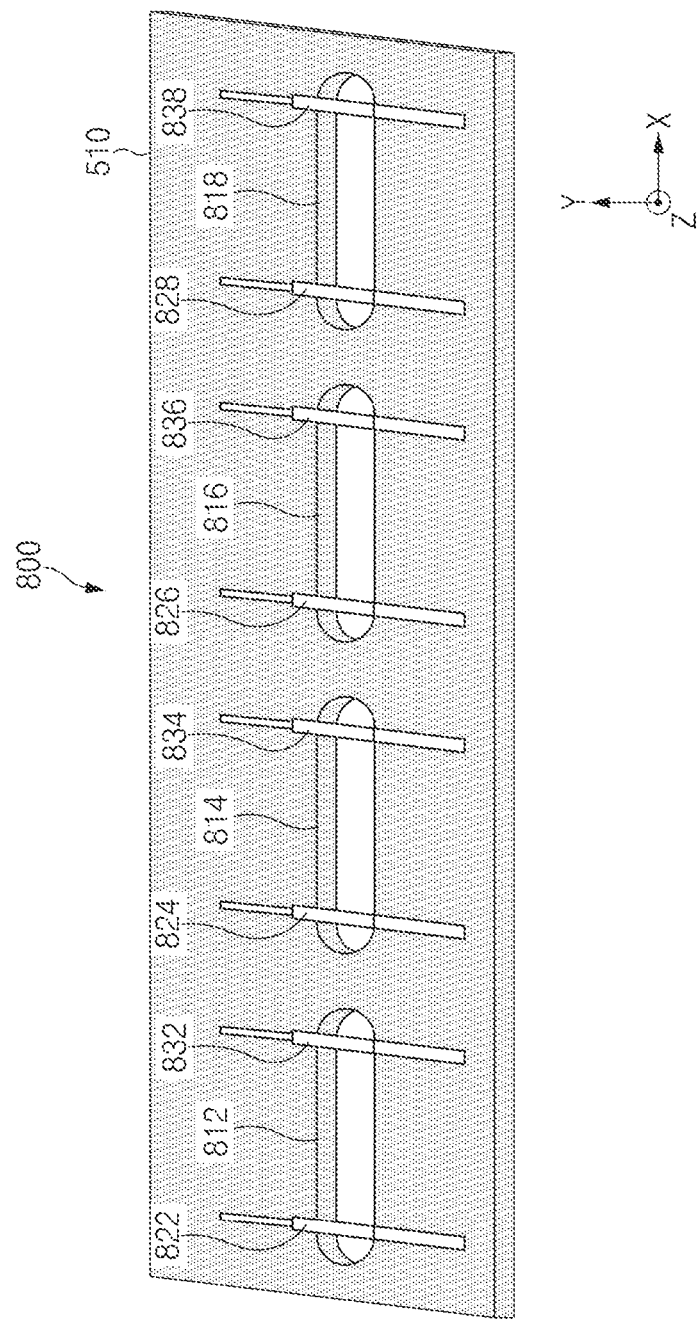
FIG. 8A is a view illustrating through-holes and a plurality of conductive paths, according to another embodiment.

FIG. 8A is a view 800 illustrating through-holes 812, 814, 816, and 818 and a plurality of conductive paths 822, 824, 826, 828, 832, 834, 836, and 838, according to another embodiment.

In an embodiment, the first to fourth through-holes 812, 814, 816, and 818 may have substantially the same structure and function as the through-holes 512, 514, 516, and 518 described with reference to FIG. 5A. Thus, below, additional description associated with the through-holes 812, 814, 816, and 818 will be omitted to avoid redundancy.

In an embodiment, the first to eighth conductive paths 822, 824, 826, 828, 832, 834, 836, and 838 may be extended in the second direction (i.e., Y-axis). The first to eighth conductive paths 822, 824, 826, 828, 832, 834, 836, and 838 may be disposed over the first to fourth through-holes 812, 814, 816, and 818 with respect to the Z-axis direction. Portions of the first to eighth conductive paths 822, 824, 826, 828, 832, 834, 836, and 838 may overlap the first to fourth through-holes 812, 814, 816, and 818.

In an embodiment, the first and second conductive paths 822 and 832 may be disposed to pass above the first through-hole 812. The first through-hole 812 may be fed from the first and second conductive paths 822 and 832 to radiate a signal.

In an embodiment, the first and second conductive paths 822 and 832 passing above the first through-hole 812 may apply in-phase powers.

Figure 8B:
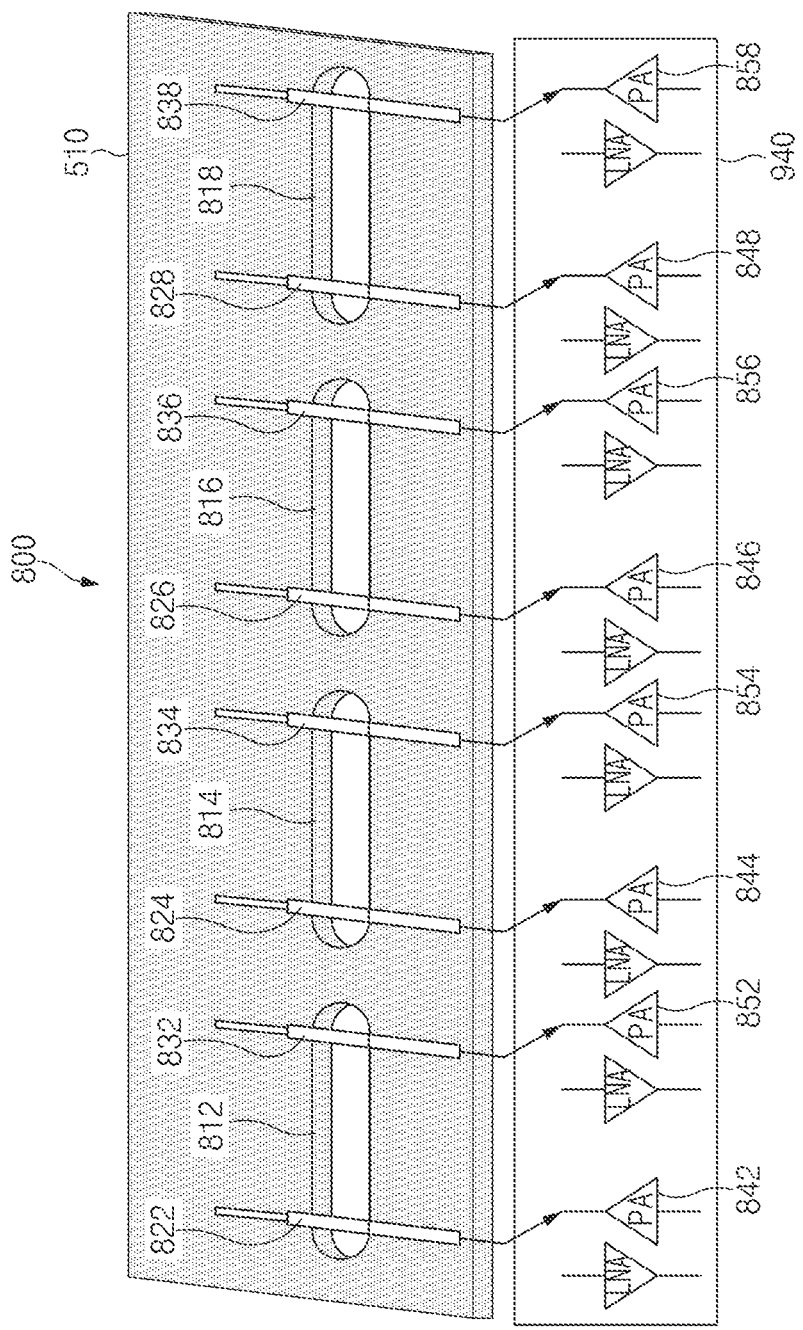
FIG. 8B is a view illustrating a feeding structure through a plurality of conductive paths, according to another embodiment.

FIG. 8B is a view 800 illustrating a feeding structure through a plurality of conductive paths 822, 824, 826, 828, 832, 834, 836, and 838, according to another embodiment.

In an embodiment, the first to eighth conductive paths 822, 824, 826, 828, 832, 834, 836, and 838 may form a feeding part. The first to eighth conductive paths 822, 824, 826, 828, 832, 834, 836, and 838 may be connected with a wireless communication circuit 940. The first to eighth conductive paths 822, 824, 826, 828, 832, 834, 836, and 838 may be fed with a signal of a frequency to be radiated from the wireless communication circuit 940. The wireless communication circuit 940 may include a transceiver circuit that transmits and/or receives an RF signal. The transceiver circuit of the wireless communication circuit 940 may include first to eighth power amplifiers (PA) 842, 844, 846, 848, 852, 854, 856, and 858 and a plurality of low noise amplifiers LNA.

In an embodiment, the first to eighth conductive paths 822, 824, 826, 828, 832, 834, 836, and 838 may be connected with the first to eighth power amplifiers 842, 844, 846, 848, 852, 854, 856, and 858. As such, the first to eighth power amplifiers 842, 844, 846, 848, 852, 854, 856, and 858 may be used as much as the number of first to eighth conductive paths 822, 824, 826, 828, 832, 834, 836, and 838. For example, in the case where the number of first to fourth through-holes 812, 814, 816, and 818 is "4", 8 chains may be used. In the case of feeding the first through-hole 812 by using the first and second conductive paths 822 and 832, a power gain may be increased as much as 3 dB compared to the case of feeding the first through-hole 812 by using one conductive path.

In an embodiment, the wireless communication circuit 940 may feed the first and second conductive paths 822 and 832 corresponding to the first through-hole 812. The wireless communication circuit 940 may feed in-phase signals to the first and second conductive paths 822 and 832. In the case of feeding the in-phase signals to the first and second conductive paths 822 and 832, there may be implemented a structure of connecting the first and second conductive paths 822 and 832 and the wireless communication circuit 940 without adding a component such as a divider structure 700 of FIG. 7A.

Figure 9:
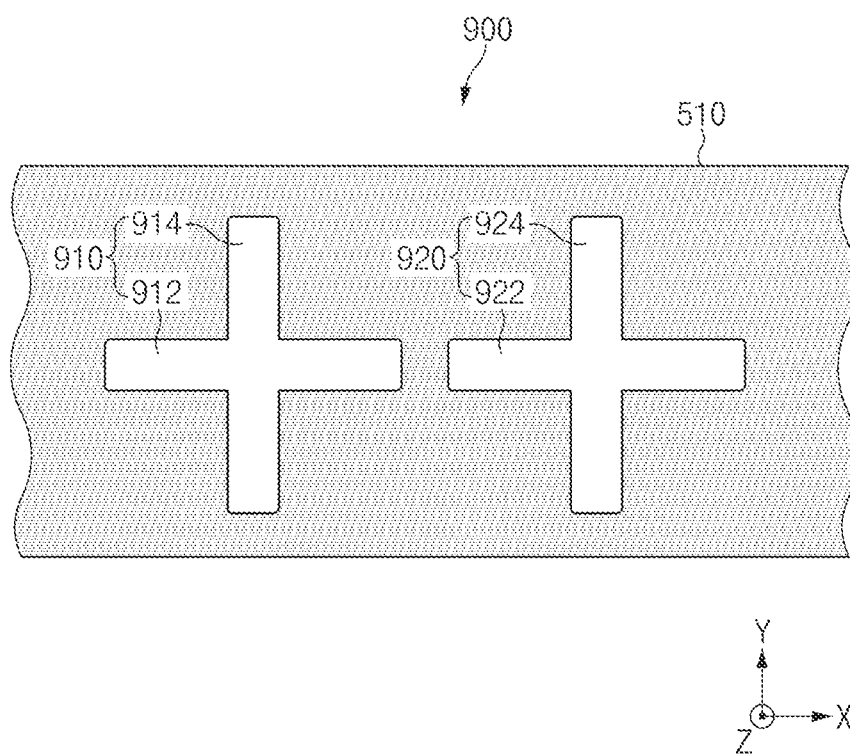
FIG. 9 is a view illustrating a first portion and a plurality of through-holes including slits crossing each other, according to an embodiment.

FIG. 9 is a view 900 illustrating the first portion 510 and a plurality of through-holes 910 and 920 including slits 912, 914, 922, and 924 crossing each other, according to an embodiment.

In an embodiment, the plurality of through-holes 910 and 920 may include the first through-hole 910 and/or the second through-hole 920. The first through-hole 910 may include the first slit 912 and/or the second slit 914. The first through-hole 910 may have a cross shape in which the first slit 912 and the second slit 914 cross each other. For example, the first through-hole 910 may have a structure in which the first slit 912 and the second slit 914 of a rectangular form cross each other at a central portion thereof. As elongated portions of the first slit 912 and the second slit 914 are disposed to have different directions, the first through-hole 910 may generate polarizations in different directions at the first slit 912 and the second slit 914. As in the above description, the second through-hole 920 may include the third slit 922 and the fourth slit 924 and may have a cross shape in which the third slit 922 and the fourth slit 924 cross each other.

In an embodiment, the first slit 912 of the first through-hole 910 may be elongated in the first direction (i.e., X-axis), and the second slit 914 thereof may be elongated in the second direction (i.e., Y-axis). In the first through-hole 910, the second slit 914 may be formed to penetrate a central portion of the first slit 912 elongated in the first direction (i.e., X-axis). As in the above description, the third slit 922 of the second through-hole 920 may be elongated in the first direction (i.e., X-axis), and the fourth slit 924 thereof may be elongated in the second direction (i.e., Y-axis).

In an embodiment, as the first slit 912 and the second slit 914 forming the first through-hole 910 are disposed to cross at right angles, there may be formed polarizations crossing at right angles. A polarization generated by the first slit 912 and a polarization generated by the second slit 914 may be perpendicular to each other. For example, a vertical polarization (V-pol.) in the second direction (i.e., Y-axis) may be formed by the first slit 912, and a horizontal polarization (H-pol.) in the first direction (i.e., X-axis) may be formed by the second slit 914.

Figure 10:
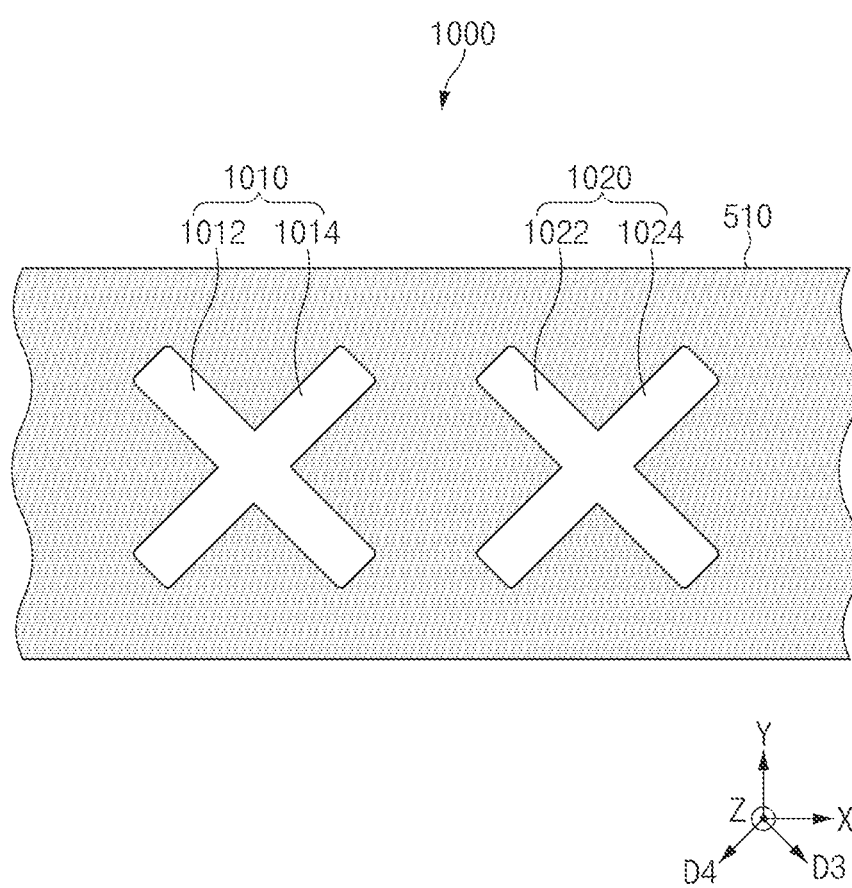
FIG. 10 is a view illustrating a first portion and a plurality of through-holes crossing each other, according to another embodiment.

FIG. 10 is a view 1000 illustrating a plurality of through-holes 1010 and 1020 crossing each other, according to another embodiment.

In an embodiment, the plurality of through-holes 1010 and 1020 may include the third through-hole 1010 and/or the fourth through-hole 1020. The third through-hole 1010 may include a fifth slit 1012 and/or a sixth slit 1014. The third through-hole 1010 may have a cross shape in which the fifth slit 1012 and/or the sixth slit 1014 cross each other. As in the above description, the fourth through-hole 1020 may include a seventh slit 1022 and/or an eighth slit 1024 and may have a cross shape in which the seventh slit 1022 and/or the eighth slit 1024 cross each other.

In an embodiment, the fifth slit 1012 may be elongated in a third direction D3, and the sixth slit 1014 may be elongated in a fourth direction D4. The third direction D3 may be a direction facing a lower right end from an upper left end from among directions crossing the X-axis and the Y-axis on an XY plane. The fourth direction D4 may be a direction facing a lower left end from an upper right end from among the directions crossing the X-axis and the Y-axis on the XY plane. In the third through-hole 1010, the sixth slit 1014 may be formed to penetrate a central portion of the fifth slit 1012. As in the above description, the seventh slit 1022 may be elongated in the third direction D3, and the eighth slit 1024 may be elongated in the fourth direction D4.

In an embodiment, as the fifth slit 1012 and the sixth slit 1014 forming the third through-hole 1010 are disposed to cross at right angles, there may be formed polarizations crossing at right angles. For example, a polarization in the fourth direction D4 may be formed by the fifth slit 1012 elongated in the third direction D3, and a polarization in the third direction D3 may be formed by the sixth slit 1014 elongated in the fourth direction D4.

Figure 11A:
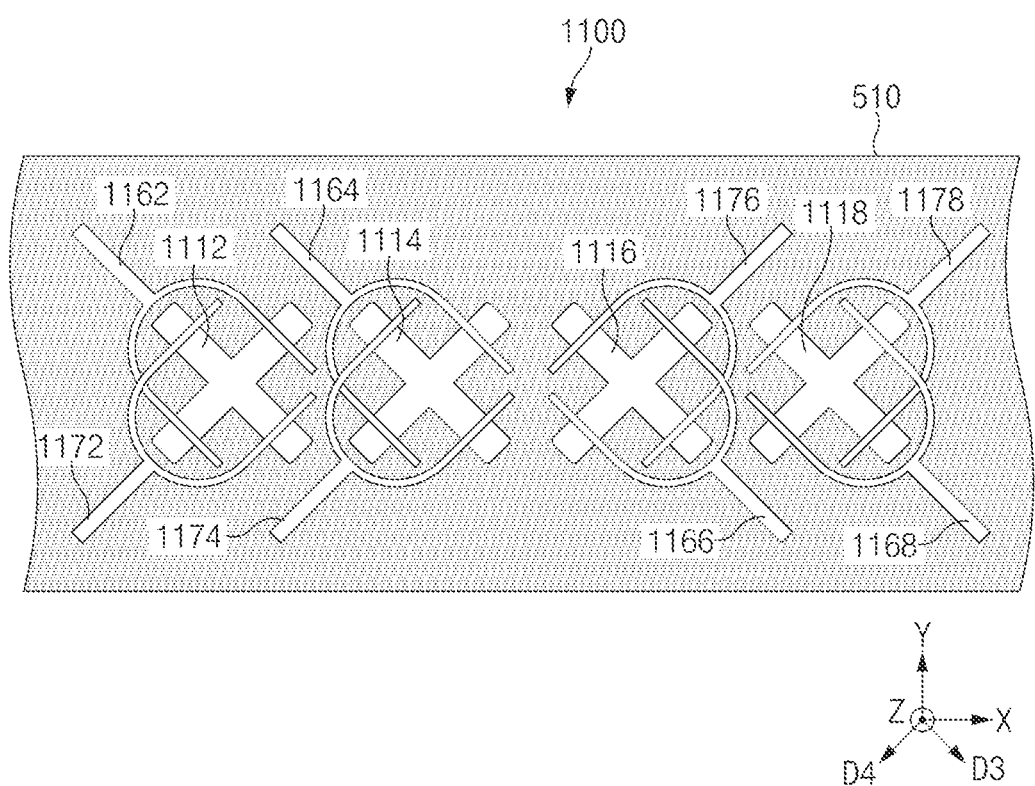
FIG. 11A is a view illustrating through-holes and a plurality of feeding parts, according to another embodiment.
Figure 11B:
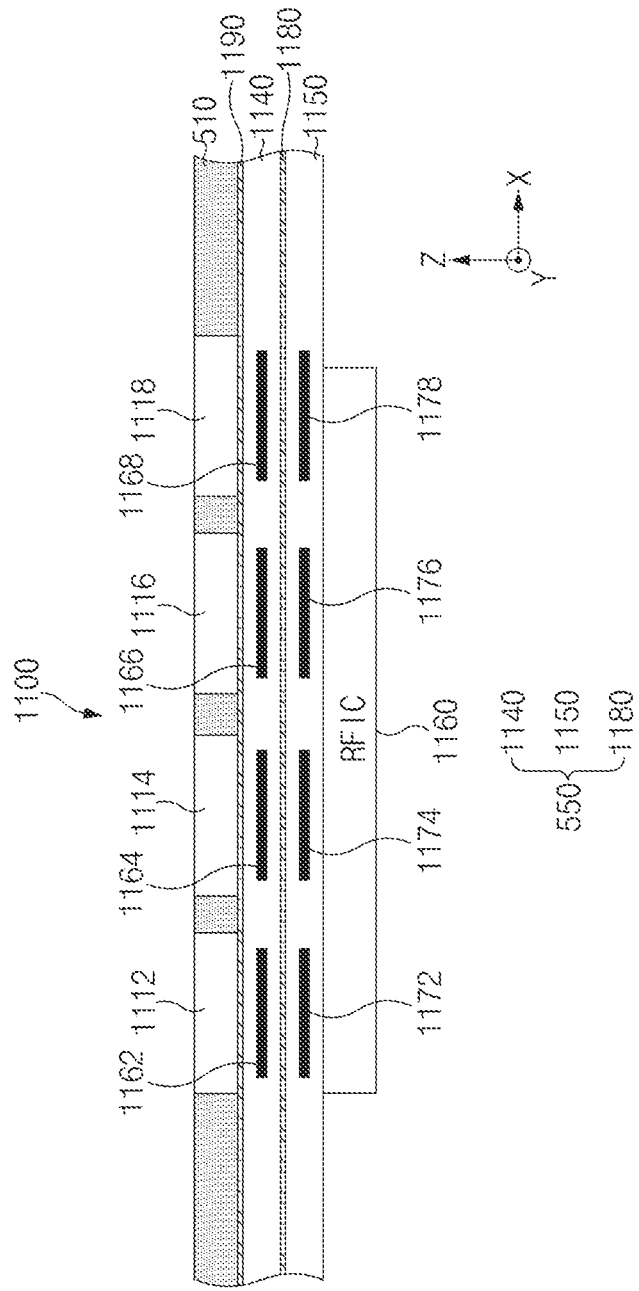
FIG. 11B is a view illustrating a first portion, a first substrate including first to fourth feeding parts, and a second substrate including fifth to eighth feeding parts, according to an embodiment.

FIG. 11A is a view illustrating through-holes 1112, 1114, 1116, and 1118 and a plurality of feeding parts 1162, 1164, 1166, 1168, 1172, 1174, 1176, and 1178, according to another embodiment. FIG. 11B is a view illustrating the first portion 510, a first layer 1140 including first to fourth feeding parts 1162, 1164, 1166, and 1168 of the substrate 550, and a second layer 1150 including fifth to eighth feeding parts 1172, 1174, 1176, and 1178 of the substrate 550, according to an embodiment. FIG. 11A is a top view of an antenna structure 1100 including the through-holes 1112, 1114, 1116, and 1118 and the plurality of feeding parts 1162, 1164, 1166, 1168, 1172, 1174, 1176, and 1178. FIG. 11B is a side view illustrating the first portion 510, the first layer 1140 including the first to fourth feeding parts 1162, 1164, 1166, and 1168 of the substrate 550, and the second layer 1150 including the fifth to eighth feeding parts 1172, 1174, 1176, and 1178 of the substrate 550. In the specification, the antenna structure 1100 may be referred to as a "structure 1100".

In an embodiment, each of the plurality of through-holes 1112, 1114, 1116, and 1118 may include two slits (e.g., the fifth slit 1012 and the sixth slit 1014 of FIG. 10) crossing each other in the third direction D3 and the fourth direction D4. The plurality of through-holes 1112, 1114, 1116, and 1118 may be arranged in the first direction (i.e., X-axis). An imaginary extension line of the third direction D3 and the fourth direction D4 may form an acute angle with an edge of one side of a side member including the first portion 510. An example in which the plurality of through-holes 1112, 1114, 1116, and 1118 are disposed on the structure 1100 as much as 4 is illustrated in FIG. 11A. However, the disclosure is not limited thereto. For example, the number of through-holes 1112, 1114, 1116, and 1118 disposed on the structure 1100 may be more or less than 4.

In an embodiment, the plurality of through-holes 1112, 1114, 1116, and 1118 may be formed to penetrate the first portion 510. The first portion 510 including the plurality of through-holes 1112, 1114, 1116, and 1118 may be a conductor. An RF signal may be transmitted and/or received through the plurality of through-holes 1112, 1114, 1116, and 1118. To transmit and/or receive an RF signal, the plurality of through-holes 1112, 1114, 1116, and 1118 may be implemented in the first portion 510.

In an embodiment, the plurality of feeding parts 1162, 1164, 1166, 1168, 1172, 1174, 1176, and 1178 may be disposed on the plurality of through-holes 1112, 1114, 1116, and 1118. In an embodiment, the plurality of feeding parts 1162, 1164, 1166, 1168, 1172, 1174, 1176, and 1178 may be disposed to face the plurality of through-holes 1112, 1114, 1116, and 1118. For example, the plurality of feeding parts 1162, 1164, 1166, 1168, 1172, 1174, 1176, and 1178 may be disposed to be spaced from the plurality of through-holes 1112, 1114, 1116, and 1118 in the Z-axis direction.

In an embodiment, the third direction D3 and the fourth direction D4 may be directions crossing at right angles. The plurality of through-holes 1112, 1114, 1116, and 1118 may be in the shape of a cross formed in the third direction D3 and the fourth direction D4. The plurality of through-holes 1112, 1114, 1116, and 1118 may be fed from the plurality of feeding parts 1162, 1164, 1166, 1168, 1172, 1174, 1176, and 1178 to radiate signals polarized in the third direction D3 and the fourth direction D4.

In an embodiment, the third direction D3 and the fourth direction D4 may be oblique directions by 45 degrees with respect to the first direction (i.e., X-axis) and the second direction (i.e., Y-axis). The plurality of through-holes 1112, 1114, 1116, and 1118 may generate linear polarizations that are inclined with respect to the first direction (i.e., X-axis) and the second direction (i.e., Y-axis) as much as 45 degrees.

In an embodiment, the plurality of feeding parts 1162, 1164, 1166, 1168, 1172, 1174, 1176, and 1178 may include first to fourth feeding parts 1162, 1164, 1166, and 1168 formed in the third direction D3 and fifth to eighth feeding parts 1172, 1174, 1176, and 1178 formed in the fourth direction D4. The first to fourth feeding parts 1162, 1164, 1166, and 1168 may feed a signal to a slit (e.g., the sixth slit 1014 of FIG. 10) disposed in the fourth direction D4 from among the plurality of through-holes 1112, 1114, 1116, and 1118. The fifth to eighth feeding parts 1172, 1174, 1176, and 1178 may feed a signal to a slit (e.g., the fifth slit 1012 of FIG. 10) disposed in the third direction D3 from among the plurality of through-holes 1112, 1114, 1116, and 1118.

In an embodiment, the first layer 1140 of the substrate 550 may include the first to fourth feeding parts 1162, 1164, 1166, and 1168. The second layer 1150 of the substrate 550 may include the fifth to eighth feeding parts 1172, 1174, 1176, and 1178. The first to fourth feeding parts 1162, 1164, 1166, and 1168 may be a metal layer of a conductive characteristic disposed within the first layer 1140 of the substrate 550. The fifth to eighth feeding parts 1172, 1174, 1176, and 1178 may be a metal layer of a conductive characteristic disposed within the second layer 1150 of the substrate 550. The first to eighth feeding parts 1162, 1164, 1166, 1168, 1172, 1174, 1176, and 1178 may be disposed to be spaced from each other as much as a given interval in the first and second layers 1140 and 1150 of the substrate 550.

In an embodiment, the first through-hole 1112 may be fed by using the first feeding part 1162 and the fifth feeding part 1172.

In an embodiment, as the first to fourth feeding parts 1162, 1164, 1166, and 1168 are disposed in the first layer 1140 of the substrate 550 and the fifth to eighth feeding parts 1172, 1174, 1176, and 1178 are disposed in the second layer 1150 of the substrate 550, the first to fourth feeding parts 1162, 1164, 1166, and 1168 and the fifth to eighth feeding parts 1172, 1174, 1176, and 1178 may be implemented in different layers.

In an embodiment, the substrate 550 may include an insulating layer that is disposed therein and is formed of a dielectric of a non-conductive characteristic. For example, a first dielectric layer 1180 that distinguishes between the first to fourth feeding parts 1162, 1164, 1166, and 1168 and the fifth to eighth feeding parts 1172, 1174, 1176, and 1178 may be disposed between the first and second layers 1140 and 1150 of the substrate 550. Also, a second dielectric layer 1190 that distinguishes between the first to fourth feeding parts 1162, 1164, 1166, and 1168 and the first portion 510 may be additionally disposed in the first layer 1140 of the substrate 550. The first and second dielectric layers 1180 and 1190 may prevent the first portion 510, the first to fourth feeding parts 1162, 1164, 1166, and 1168, and/or the fifth to eighth feeding parts 1172, 1174, 1176, and 1178 from being short-circuited.

In an embodiment, the first feeding part 1162 and the fifth feeding part 1172 may feed the first through-hole 1112. The first feeding part 1162 and the fifth feeding part 1172 may perform feeding such that polarizations perpendicular to each other are generated. The first through-hole 1112 may generate dual linear polarizations vertically polarized based on the fed signals. In the structure 1100, the first portion 510 around the plurality of through-holes 1112, 1114, 1116, and 1118 may be a radiator. The structure 1100 may transmit and/or receive a dual linear polarized RF signal by using the plurality of through-holes 1112, 1114, 1116, and 1118. In the case where polarizations cross at right angles, isolation between the two polarizations may be secured.

Figure 12A:
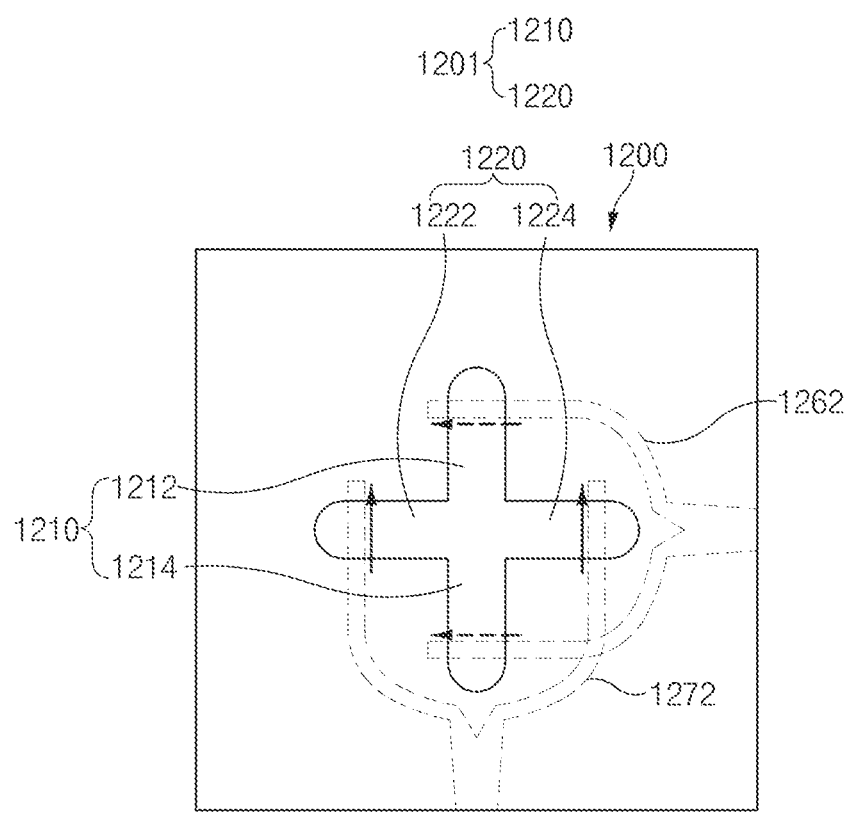
FIGS. 12A and 12B are views illustrating vertical and horizontal polarizations generated at a through-hole crossing each other, according to an embodiment.
Figure 12B:
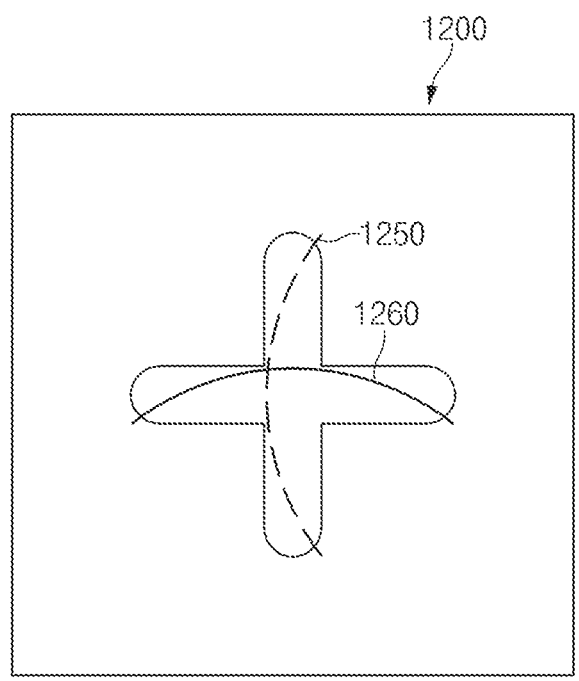

FIGS. 12A, 12B, 12C, and 12B are views illustrating vertical and horizontal polarizations generated at a through-hole crossing each other, according to an embodiment.

In an embodiment, a through-hole 1201 (e.g., the first through-hole 1112 of FIG. 11A) may include a first slit 1210 and a second slit 1220 crossing each other. The first slit 1210 may include first and second portions 1212 and 1214. The second slit 1220 may include third and fourth portions 1222 and 1224. As illustrated in FIG. 12A, the through-hole 1201 may have a cross-shaped structure including the first to fourth portions 1212, 1214, 1222, and 1224. The first and second portions 1212 and 1214 may radiate a horizontally polarized signal as feeding for horizontal polarization in a horizontal direction is made from a feeding part 1262 (e.g., the first feeding part 1162 of FIG. 11B). The third and fourth portions 1222 and 1224 may radiate a vertically polarized signal as feeding for vertical polarization is made from a feeding part 1272 (e.g., the fifth feeding part 1172 of FIG. 11B).

In an embodiment, a through-hole including slits crossing each other may form a horizontal polarization 1250 and a vertical polarization 1260 as illustrated in FIG. 12B. A through-hole may generate a signal polarized in a feeding direction.

In an embodiment, a through-hole including slits crossing each other may form a current. The through-hole may be fed from a plurality of conductive paths and may generate a surface current on a surface of a metal layer excluding the through-hole.

In an embodiment, a through-hole including slits crossing each other may form an electric field (E-field) as illustrated in FIGS. 12C and 12D. The through-hole may be fed from a plurality of conductive paths and may generate an electric field facing from one side surface to an opposite side surface in the through-hole.

Figure 13:
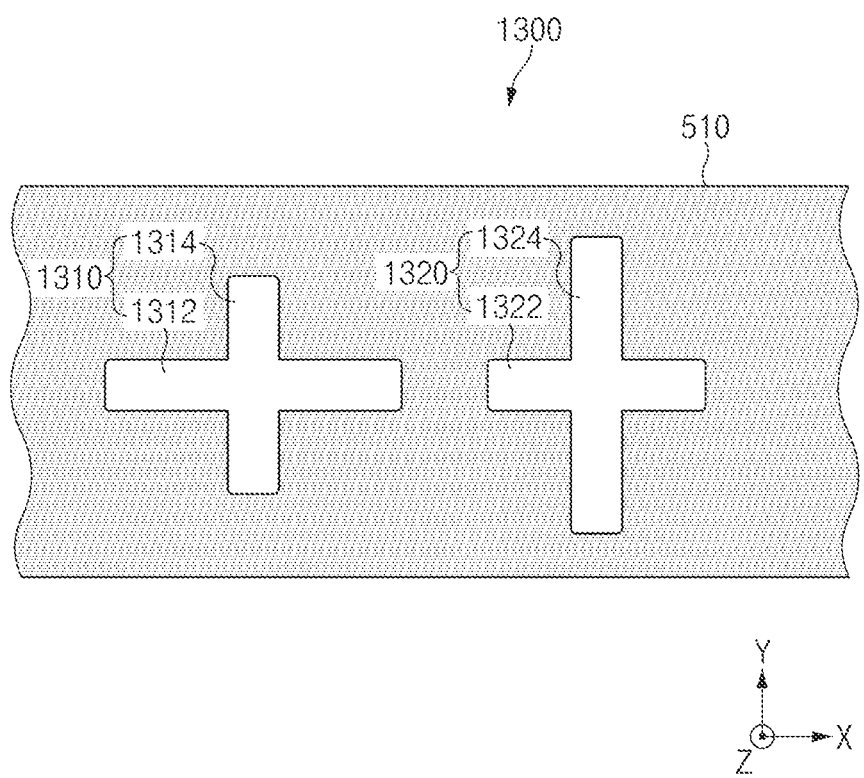
FIG. 13 is a view illustrating a first portion and a plurality of through-holes including slits crossing each other, according to another embodiment.

FIG. 13 is a view 1300 illustrating the first portion 510 and a plurality of through-holes 1310 and 1320 including slits 1312, 1314, 1322, and 1324 crossing each other, according to another embodiment.

In an embodiment, the plurality of through-holes 1310 and 1320 may include a fifth through-hole 1310 and/or a sixth through-hole 1320. The fifth through-hole 1310 may include a ninth slit 1312 and a tenth slit 1314. The fifth through-hole 1310 may have a cross shape in which the ninth slit 1312 and the tenth slit 1314 cross each other. The sixth through-hole 1320 may include an eleventh slit 1322 and a twelfth slit 1324 and may have a cross shape in which the eleventh slit 1322 and the twelfth slit 1324 cross each other.

In an embodiment, the ninth slit 1312 of the fifth through-hole 1310 may be extended in the first direction (i.e., X-axis), and the tenth slit 1314 thereof may be extended in the second direction (i.e., Y-axis). The tenth slit 1314 may be formed to penetrate a central portion of the ninth slit 1312. As in the above description, the eleventh slit 1322 of the sixth through-hole 1320 may be elongated in the first direction (i.e., X-axis), and the twelfth slit 1324 thereof may be elongated in the second direction (i.e., Y-axis).

In an embodiment, the ninth slit 1312 and the tenth slit 1314 forming the fifth through-hole 1310 may have different lengths. The ninth slit 1312 and the tenth slit 1314 may have different frequency bands. For example, in the case where a length of the ninth slit 1312 is greater than a length of the tenth slit 1314, a frequency band of a signal that is radiated from the ninth slit 1312 may be lower than a frequency band of a signal that is radiated from the tenth slit 1314. As such, there may be formed a dual band radiator in which a frequency of a vertical polarization formed at the ninth slit 1312 and a frequency of a horizontal polarization formed at the tenth slit 1314 are different. As in the above description, the eleventh slit 1322 and the twelfth slit 1324 forming the sixth through-hole 1320 may have different lengths.

Figure 14:
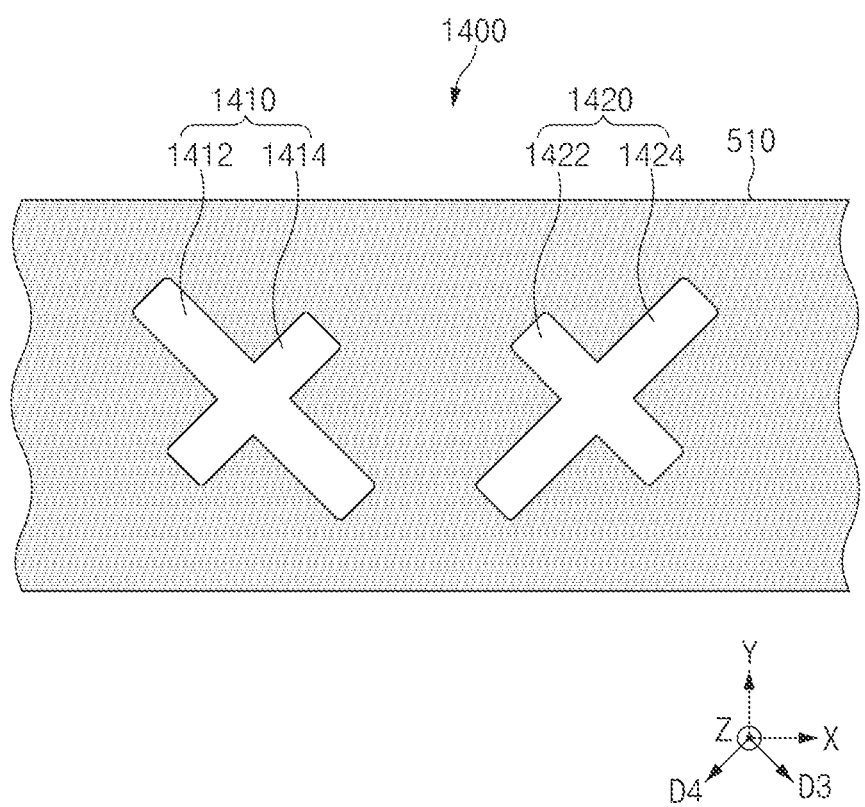
FIG. 14 is a view illustrating a first portion and a plurality of through-holes including slits crossing each other, according to another embodiment.

FIG. 14 is a view 1400 illustrating the first portion 510 and a plurality of through-holes 1410 and 1420 including slits 1412, 1414, 1422, and 1424 crossing each other, according to another embodiment.

In an embodiment, the plurality of through-holes 1410 and 1420 may include the seventh through-hole 1410 and/or the eighth through-hole 1420. The seventh through-hole 1410 may include the thirteenth slit 1412 and the fourteenth slit 1414. The seventh through-hole 1410 may have a cross shape in which the thirteenth slit 1412 and the fourteenth slit 1414 cross each other. The eighth through-hole 1420 may include the fifteenth slit 1422 and the sixteenth slit 1424 and may have a cross shape in which the fifteenth slit 1422 and the sixteenth slit 1424 cross each other.

In an embodiment, the thirteenth slit 1412 of the seventh through-hole 1410 may be extended in the third direction D3, and the fourteenth slit 1414 thereof may be extended in the fourth direction D4. The fourteenth slit 1414 may be formed to penetrate a central portion of the thirteenth slit 1412. As in the above description, the fifteenth slit 1422 of the eighth through-hole 1420 may be elongated in the third direction D3, and the sixteenth slit 1424 thereof may be elongated in the fourth direction D4.

In an embodiment, the thirteenth slit 1412 and the fourteenth slit 1414 forming the seventh through-hole 1410 may have different lengths. The thirteenth slit 1412 and the fourteenth slit 1414 may have different frequency bands. For example, in the case where a length of the thirteenth slit 1412 is greater than a length of the fourteenth slit 1414, a frequency band of a signal that is radiated from the thirteenth slit 1412 may be lower than a frequency band of a signal that is radiated from the fourteenth slit 1414. As such, there may be formed a dual band radiator in which a frequency of a vertical polarization formed at the thirteenth slit 1412 and a frequency of a horizontal polarization formed at the fourteenth slit 1414 are different. As in the above description, the fifteenth slit 1422 and the sixteenth slit 1424 forming the eighth through-hole 1420 may have different lengths.

FIGS. 15A to 15H are views 1500 illustrating through-holes 1512, 1514, 1516, 1518, 1522, 1524, 1526, 1528, 1532, 1534, 1536, and 1538 disposed at a side member of an electronic device so as to cross each other, according to various embodiments.

In an embodiment, a housing may include a first plate 1540, a second plate 1550, and a side member 1560.

In an embodiment, the first plate 1540 may form a first surface (or a front surface) of the electronic device 101. The first plate 1540 may be formed to face the first surface of the electronic device 101. At least a portion of the first plate 1540 may be substantially transparent. For example, the first plate 1540 may be formed of a polymer plate, or a glass plate including various coating layers. The first plate 1540 may expose a display of the display device 160 through a substantially transparent portion of the first surface.

In an embodiment, the second plate 1550 may form a second surface (or a rear surface) of the electronic device 101. The second plate 1550 may be formed to face the second surface of the electronic device 101. As such, the second plate 1550 may be formed to face away from the first plate 1540. The second plate 1550 may be substantially opaque. For example, the second plate 1550 may be formed of a coated or colored glass, a ceramic, a polymer, a metal (e.g., aluminum, stainless steel (STS), or magnesium), or a combination of at least two of the materials.

In an embodiment, the side member 1560 may form a side surface that surrounds a space between the first surface and the second surface of the electronic device 101. The side member 1560 may surround a space between the first plate 1540 and the second plate 1550. The side member 1560 may be connected with the second plate 1550. For example, the side member 1560 may be coupled to the first plate 1540 and the second plate 1550 and may have a side bezel structure including metal and/or polymer. For another example, the side member 1560 may be integrally formed with the second plate 1550 and may include the same material (e.g., a metal material such as aluminum) as the second plate 1550.

Figure 15A:
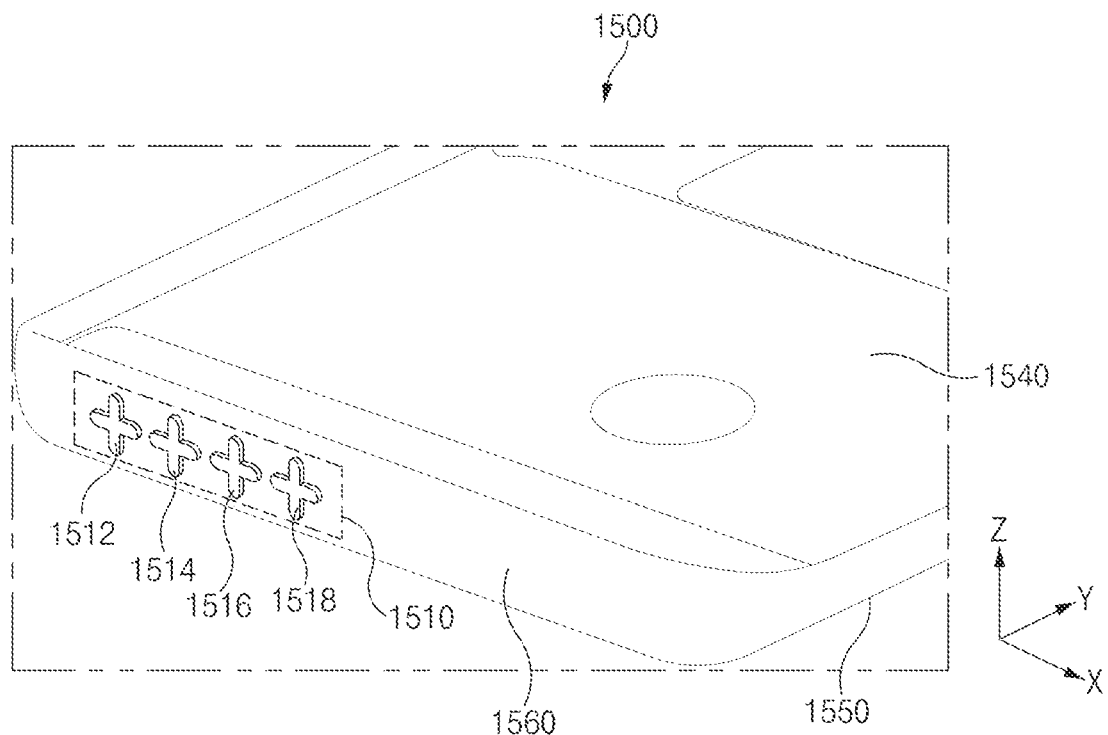
FIGS. 15A to 15H are views illustrating through-holes disposed at a side member of an electronic device so as to cross each other, according to various embodiments.
Figure 15B:
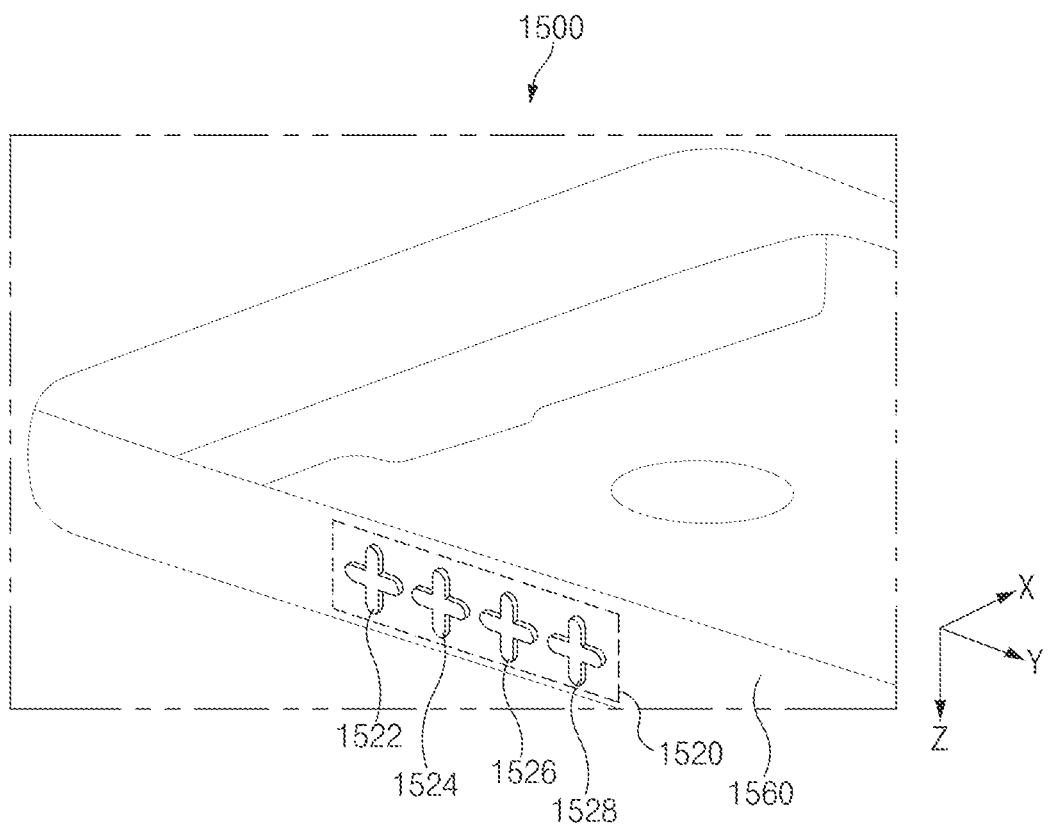
Figure 15C:
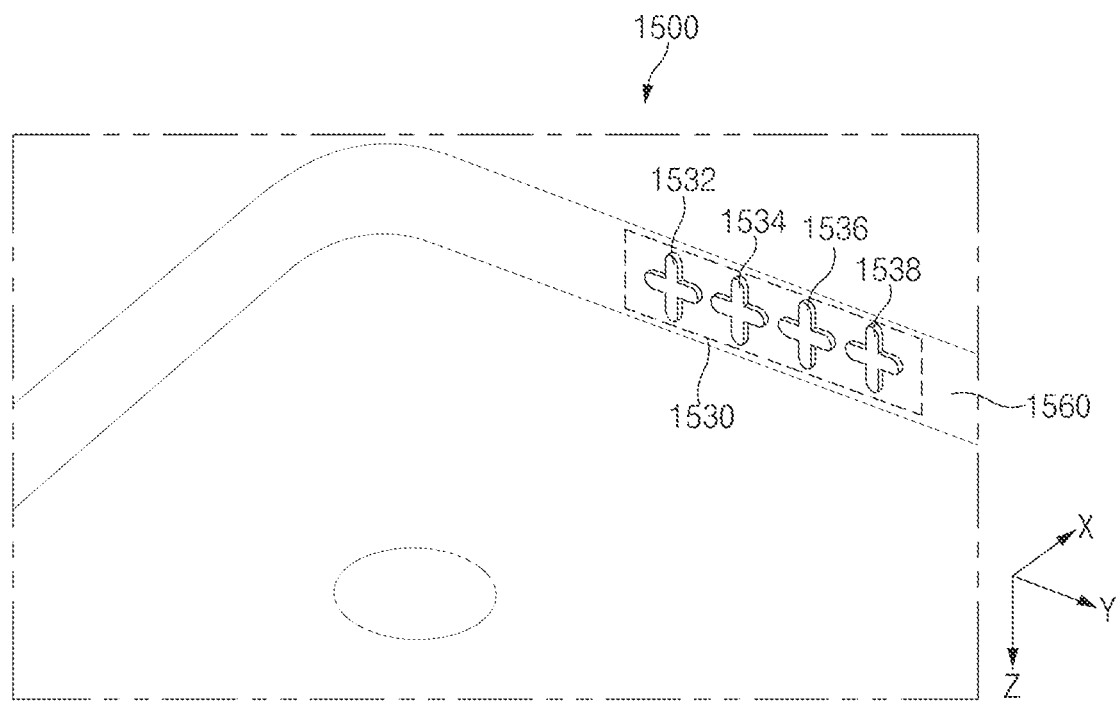
Figure 15D:
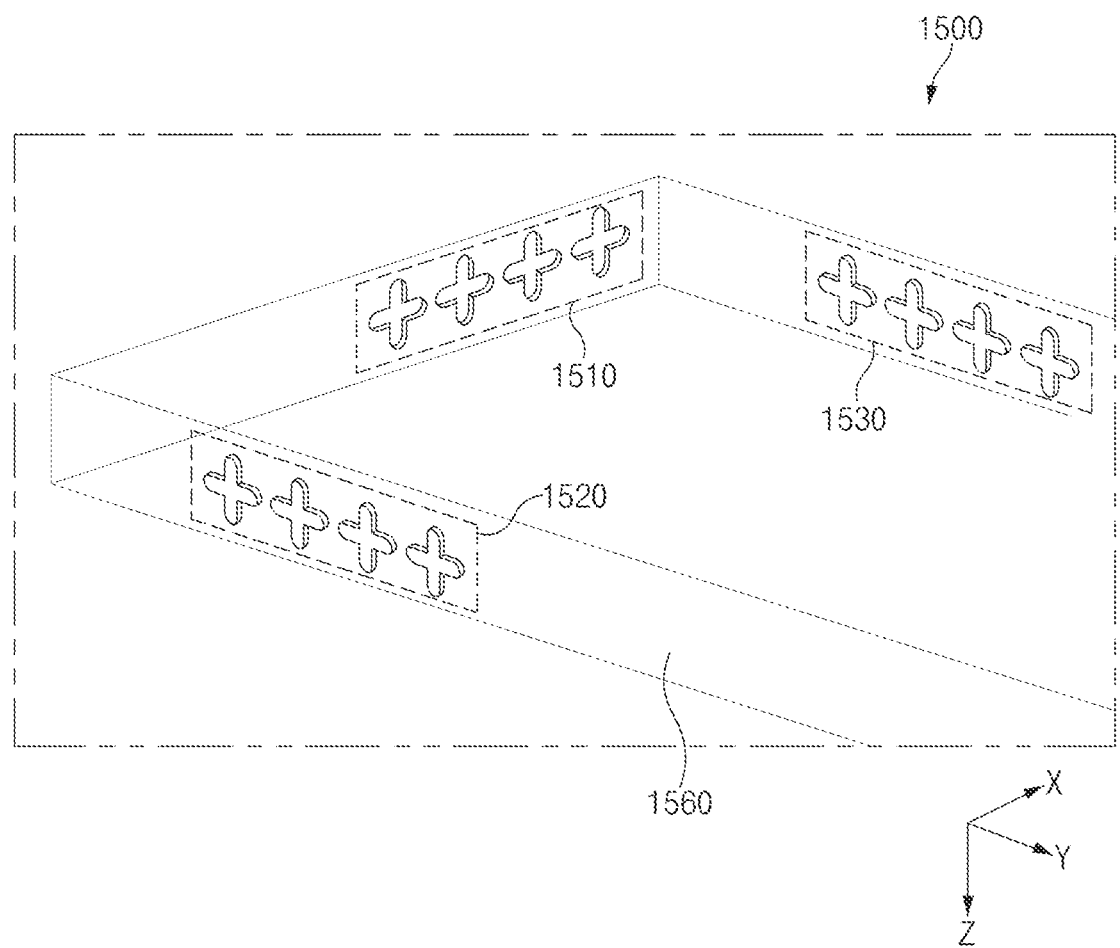
Figure 15E:
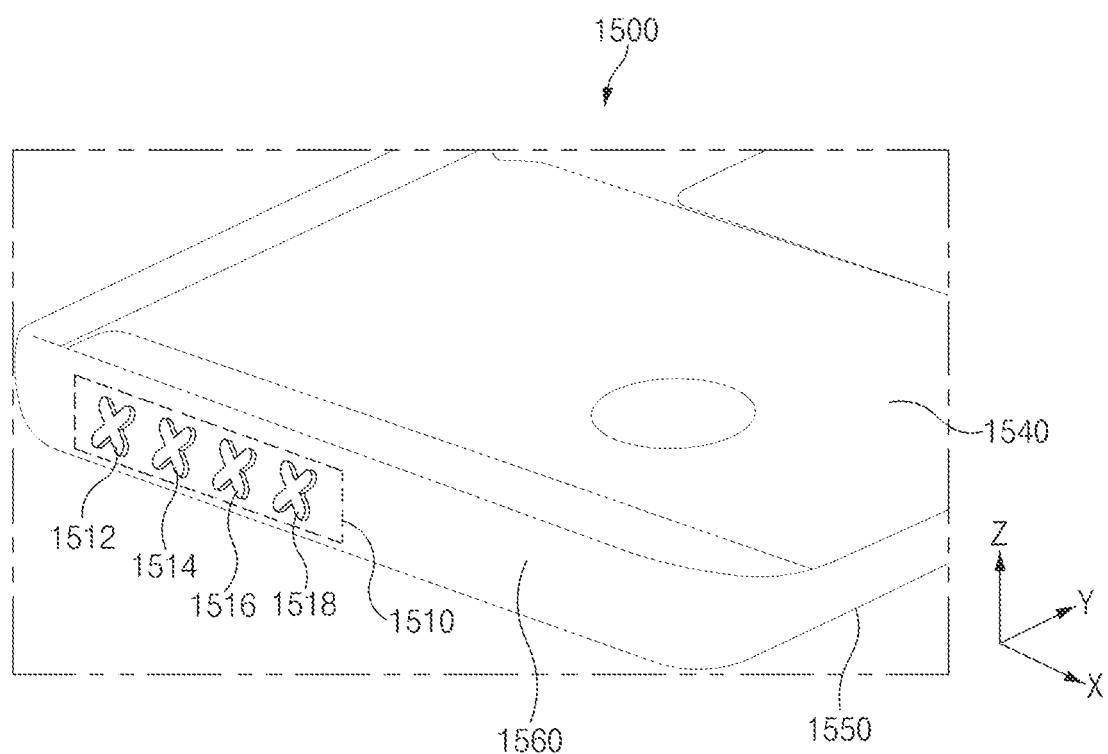
Figure 15F:
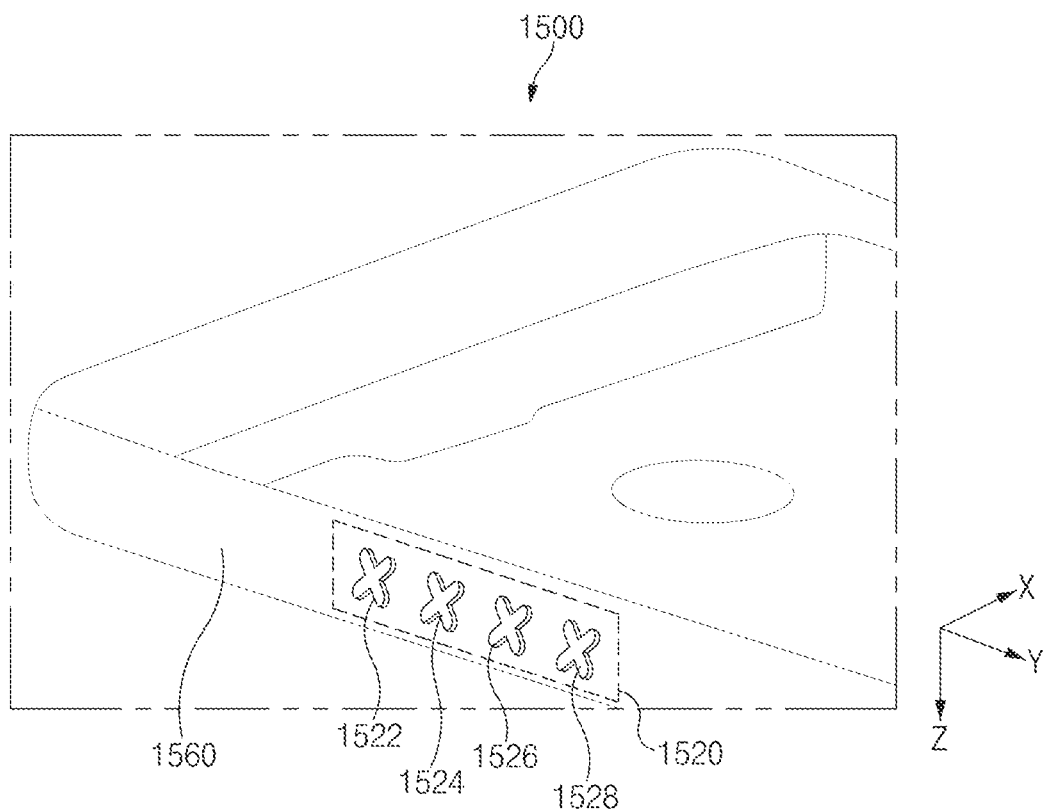
Figure 15G:
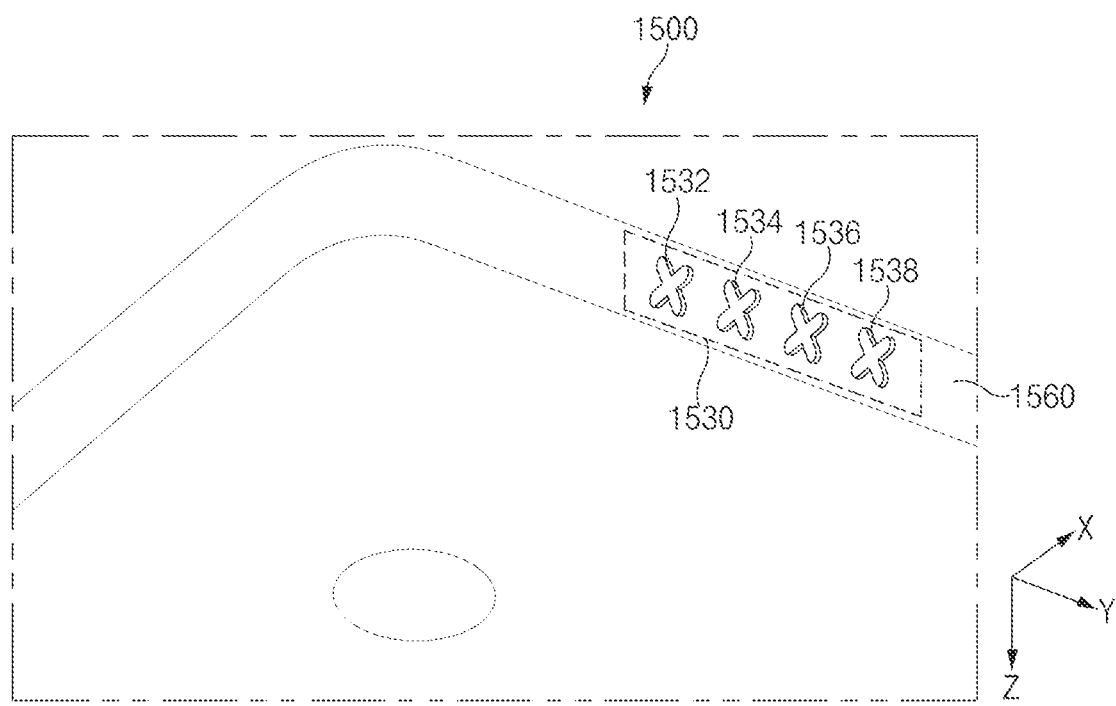
Figure 15H:
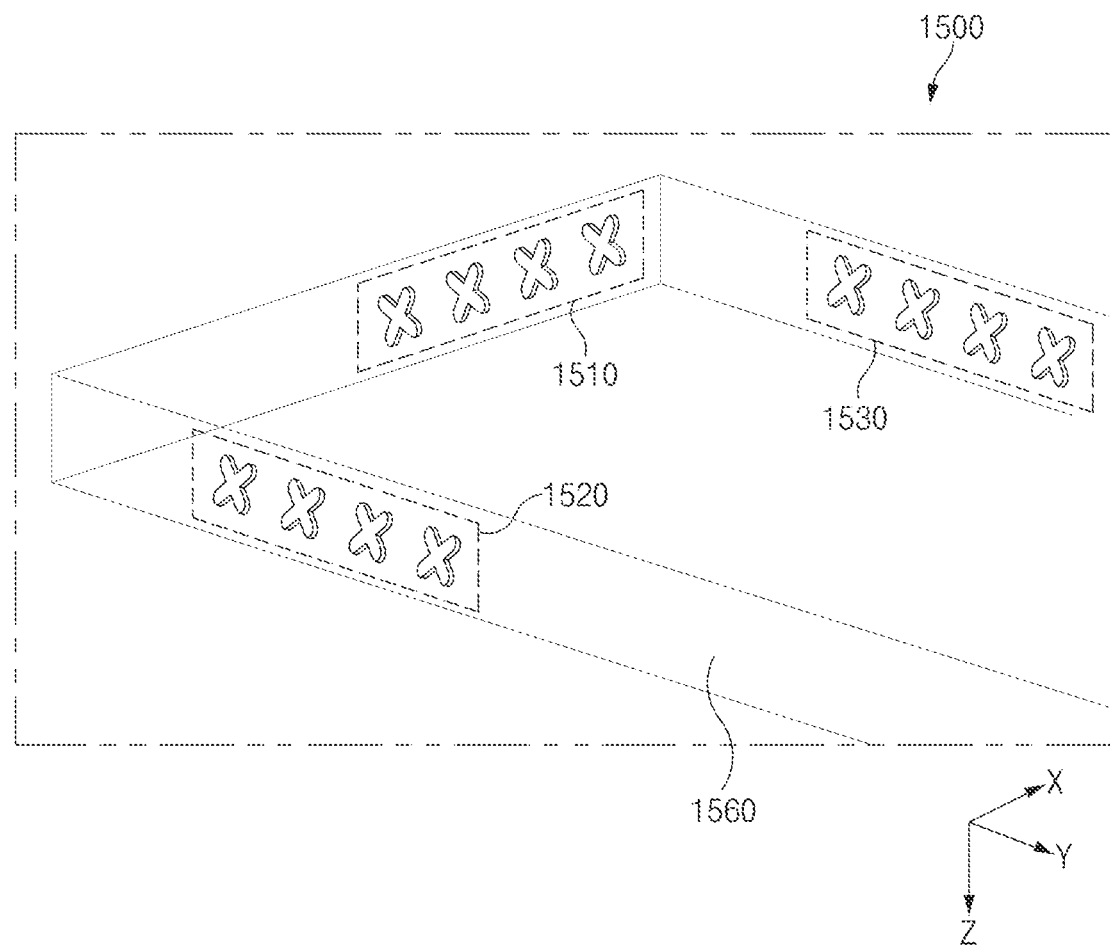

In an embodiment, the side member 1560 may include first to third portions 1510, 1520, and 1530 (e.g., the first portion 510 of FIG. 5A). For example, as illustrated in FIG. 15A, the first portion 1510 may be disposed at an upper end of the electronic device 101. The upper end of the electronic device 101 may be a −Y-axis direction. For another example, as illustrated in FIG. 15B, the second portion 1520 may be disposed at an upper left end of the electronic device 101. For another example, as illustrated in FIG. 15C, the third portion 1530 may be disposed at an upper right end of the electronic device 101.

In an embodiment, the first to third portions 1510, 1520, and 1530 may include a conductive material or a non-conductive material. First to fourth through-holes 1512, 1514, 1516, and 1518 that are arranged in the first direction (i.e., X-axis) substantially parallel to the first plate 1540 may be disposed at the first portion 1510. Fifth to eighth through-holes 1522, 1524, 1526, and 1528 that are arranged in the first direction (i.e., X-axis) may be disposed at the second portion 1520. Ninth to twelfth through-holes 1532, 1534, 1536, and 1538 that are arranged in the first direction (i.e., X-axis) may be disposed at the third portion 1530. The first to fourth through-holes 1512, 1514, 1516, and 1518 included in the first portion 1510 may be formed at a metal frame of the electronic device 101. The fifth to eighth through-holes 1522, 1524, 1526, and 1528 included in the second portion 1520 may be spaced from the first to fourth through-holes 1512, 1514, 1516, and 1518 of the electronic device 101 and may be formed at the metal frame. The ninth to twelfth through-holes 1532, 1534, 1536, and 1538 included in the third portion 1530 may be spaced from the first to eighth through-holes 1512, 1514, 1516, 1518, 1522, 1524, 1526, and 1528 and may be formed at the metal frame of the electronic device 101. A non-conductive material may be filled in the first to twelfth through-holes 1512, 1514, 1516, 1518, 1522, 1524, 1526, 1528, 1532, 1534, 1536, and 1538.

In an embodiment, as illustrated in FIGS. 15A to 15D, four cross-shaped radiation through-holes or slots may be disposed at the first to third portions 1510, 1520, and 1530 of the side member 1560. However, the disclosure is not limited thereto. For example, the number of cross-shaped radiation through-holes or slots disposed at the first to third portions 1510, 1520, and 1530 may be more or less than 4. Also, an example in which a direction in which one of through-holes of the cross-shaped radiation through-holes or slots is disposed is parallel to the X-axis is illustrated in FIGS. 15A to 15D. However, the disclosure is not limited thereto. For example, as illustrated in FIGS. 15E to 15H, a through-hole or slit of a cross-shaped radiation through-hole or slot may be disposed in a third direction (e.g., the third direction D3 of FIG. 10) or a fourth direction (e.g., the fourth direction D4 of FIG. 10) depending on a polarization direction of a signal to be radiated from the cross-shaped radiation through-hole or slot.

Figure 16:
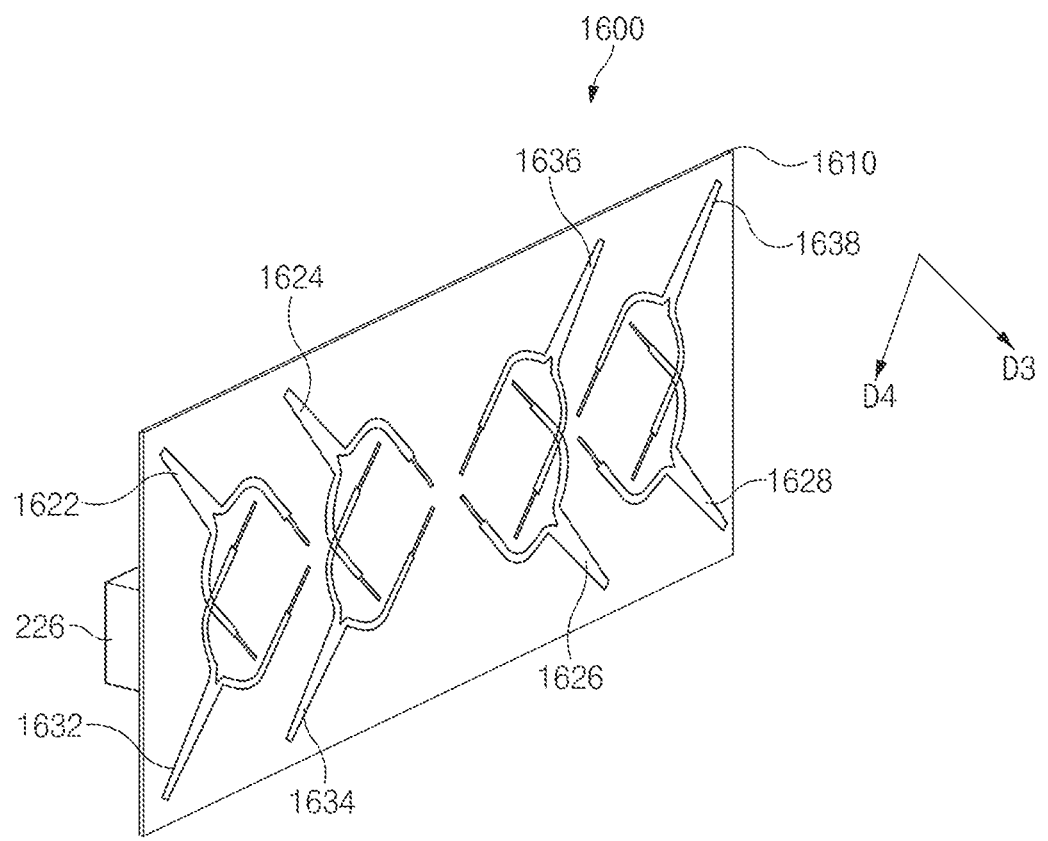
FIG. 16 is a view illustrating an antenna structure including a plurality of feeding parts, according to an embodiment.

FIG. 16 is a view 1600 illustrating a printed circuit board 1610 including a plurality of feeding parts 1622, 1624, 1626, 1628, 1632, 1634, 1636, and 1638, according to an embodiment.

According to an embodiment, the third RFIC 226 may be disposed on the printed circuit board 1610. For example, the third RFIC 226 may be mounted on one surface of the printed circuit board 1610 in the form of a surface mount device (SMD). The printed circuit board 1610 may transfer a signal of a specified frequency, which the third RFIC 226 transmits and/or receives, to a radiator.

In an embodiment, an antenna structure may include the plurality of feeding parts 1622, 1624, 1626, 1628, 1632, 1634, 1636, and 1638. First to fourth feeding parts 1622, 1624, 1626, and 1628 may be connected with the third RFIC 226 and may transfer a signal of the specified frequency that the third RFIC 226 transmits and/or receives. Fifth to eighth feeding parts 1632, 1634, 1636, and 1638 may be connected with the third RFIC 226 and may transfer a signal of the specified frequency that the third RFIC 226 transmits and/or receives. The first to fourth feeding parts 1622, 1624, 1626, and 1628 may transfer a signal of a specified frequency to a radiator (e.g., the fifth slit 1012 of the third through-hole 1010 of FIG. 10) including a through-hole or slot such that the radiator radiates a signal polarized in a first direction (e.g., the third direction D3 of FIG. 10). The fifth to eighth feeding parts 1632, 1634, 1636, and 1638 may transfer a signal of a specified frequency to a radiator (e.g., the sixth slit 1014 of the third through-hole 1010 of FIG. 10) including a through-hole or slot such that the radiator radiates a signal polarized in a second direction (e.g., the fourth direction D4 of FIG. 10).

Figure 17:
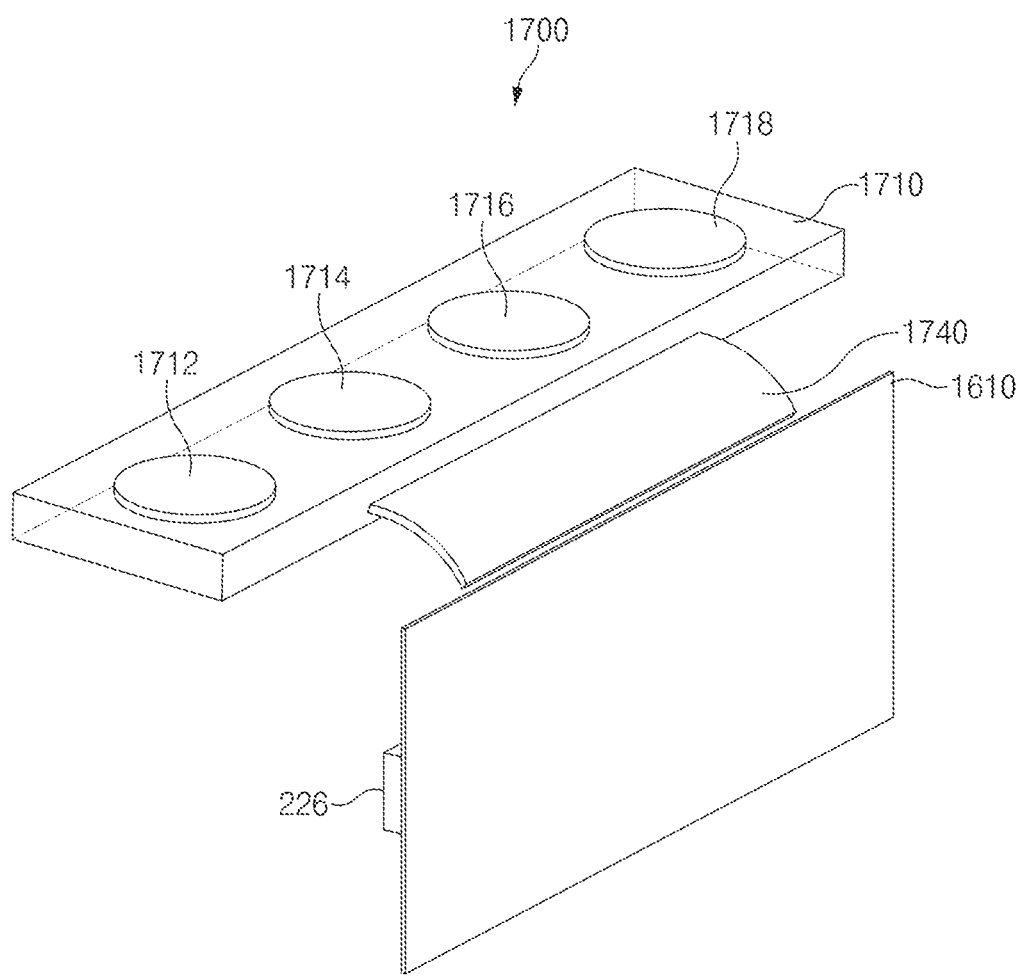
FIG. 17 is a view illustrating a structure in which an antenna structure including a plurality of conductive patches and a printed circuit board of FIG. 16 are connected by a connection member, according to an embodiment.

FIG. 17 is a view 1700 illustrating a structure in which an antenna structure 1710 including a plurality of conductive patches 1712, 1714, 1716, and 1718 and the printed circuit board 1610 of FIG. 16 are connected by a connection member 1740, according to an embodiment.

In an embodiment, the antenna structure 1710 may include the plurality of conductive patches 1712, 1714, 1716, and 1718. The plurality of conductive patches 1712, 1714, 1716, and 1718 may be disposed inside the antenna structure 1710 or on one surface of the antenna structure 1710. The plurality of conductive patches 1712, 1714, 1716, and 1718 may be arranged on the antenna structure 1710 at regular intervals. The plurality of conductive patches 1712, 1714, 1716, and 1718 may radiate or receive an RF signal. The plurality of conductive patches 1712, 1714, 1716, and 1718 may be provided with RF signals from the RFIC 226 disposed on the printed circuit board 1610.

In an embodiment, the plurality of conductive patches 1712, 1714, 1716, and 1718 may be arranged on one surface of the antenna structure 1710 as much as 4. However, the disclosure is not limited thereto. For example, the antenna structure 1710 may include conductive patches, the number of which is more or less than 4. Also, each of the plurality of conductive patches 1712, 1714, 1716, and 1718 may be in the shape of a circle or a polygon, but the disclosure is not limited thereto.

In an embodiment, the connection member 1740 may include a connection part (e.g., the connection parts 552, 554, 556, and 558 of FIG. 5A). The connection member 1740 may be formed of a flexible printed circuit board (FPCB) connecting the printed circuit board 1610 of FIG. 16 and the plurality of conductive patches 1712, 1714, 1716, and 1718. The connection member 1740 may transfer signals between the plurality of conductive patches 1712, 1714, 1716, and 1718 and the printed circuit board 1610.

In an embodiment, the antenna structure 1710 and the printed circuit board 1610 connected by the connection member 1740 may form one antenna module. The plurality of conductive patches 1712, 1714, 1716, and 1718 of the antenna structure 1710 may form a beam in a direction different from that of radiators (e.g., the third and fourth through-holes 1010 and 1020 of FIG. 10) fed from a plurality of feeding parts (e.g., the first to eighth feeding parts 1622, 1624, 1626, 1628, 1632, 1634, 1636, and 1638 of FIG. 16) formed at the printed circuit board 1610. The electronic device 101 may transmit and/or receive signals in different directions by using beams formed in different directions.

Figure 18:
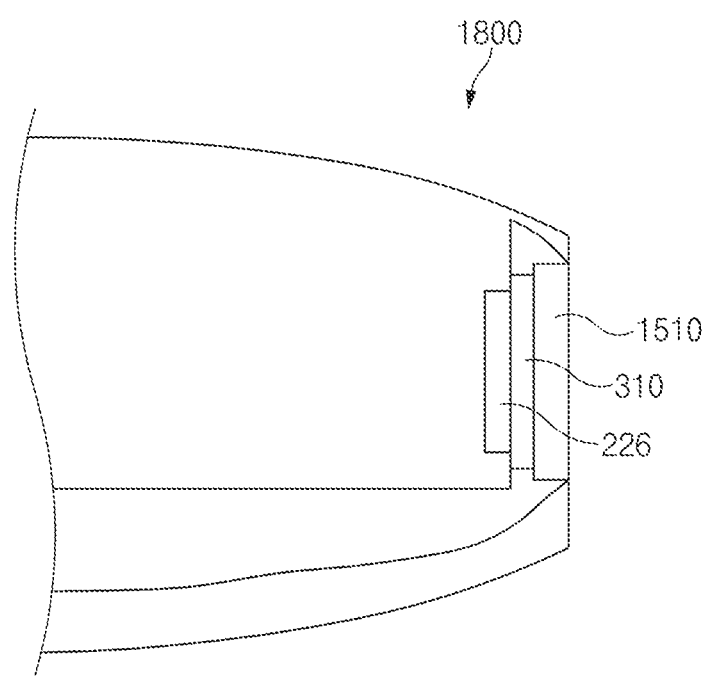
FIG. 18 is a view illustrating a housing and a side member of an electronic device, according to an embodiment.

FIG. 18 is a view 1800 illustrating a housing and a side member (e.g., 1560) of an electronic device, according to an embodiment.

In an embodiment, a first portion (e.g., the first portion 1510 of FIG. 15A) may be included in a side member (e.g., the side member 1560 of FIG. 15A) surrounding a space between first and second plates (e.g., the first and second plates 1540 and 1550 of FIG. 15A) of the housing. The radiators of the first portion 1510 may be in the shape of a line-type through-hole or slot as illustrated in FIGS. 5A to 5C or in the shape of a cross-type through-hole or slot as illustrated in FIGS. 9 to 14.

In an embodiment, the first portion 1510 may face the printed circuit board 310. For example, an inner surface of the first portion 1510 being an outer metal layer of a side surface or a portion of a metal housing may closely contact one surface of the printed circuit board 310. The first portion 1510 may include a through-hole for coupling with the printed circuit board 310.

In an embodiment, in coupling the first portion 1510 and the printed circuit board 310, an additional adhesive layer or an outer coupling structure for coupling may be further provided on one surface of the first portion 1510 or the printed circuit board 310. For example, the outer coupling structure may be implemented with a metal structure or an injection-molding structure.

In an embodiment, the third RFIC 226 may be mounted on one surface of the printed circuit board 310. The first portion 1510 may be electrically connected with the third RFIC 226 and may transmit and/or receive a signal of a specified frequency.

Figure 19A:
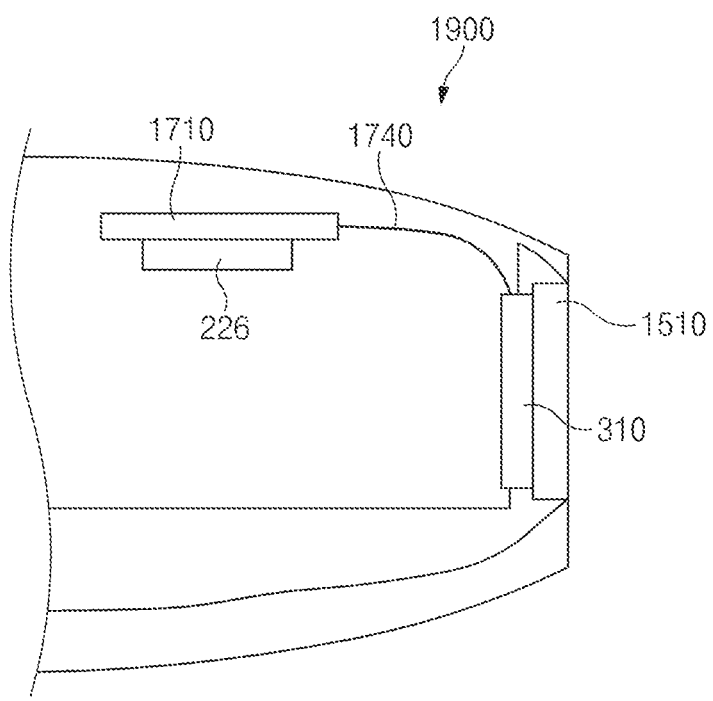
FIG. 19A is a view illustrating a coupling structure of an electronic device, according to an embodiment.

FIG. 19A is a view 1900 illustrating the electronic device 101 in which the antenna structure 1710 and the printed circuit board 1610 are coupled, according to an embodiment.

In an embodiment, the third RFIC 226 may be attached on one surface facing a first plate from among opposite surfaces of the antenna structure 1710. A plurality of conductive patches (e.g., the plurality of conductive patches 1712, 1714, 1716, and 1718 of FIG. 17) may be disposed on one surface facing a second plate from among the opposite surfaces of the antenna structure 1710. A side surface of the antenna structure 1710 may be connected with the printed circuit board 310 through the connection member 1740. The first portion 1510 may be attached to the printed circuit board 310 of the electronic device 101 in a surface-to-surface manner.

In an embodiment, the connection member 1740 may include a plurality of conductive paths. The plurality of conductive paths may connect the antenna structure 1710 and the printed circuit board 310 (e.g., the substrate 550 of FIG. 5A) such that the antenna structure 1710 and the printed circuit board 310 are electrically connected. The printed circuit board 310 and the antenna structure 1710 may be electrically connected with the third RFIC 226. The printed circuit board 310 and the antenna structure 1710 may form beams in different directions to transmit and/or receive a signal of a specified frequency.

Figure 19B:
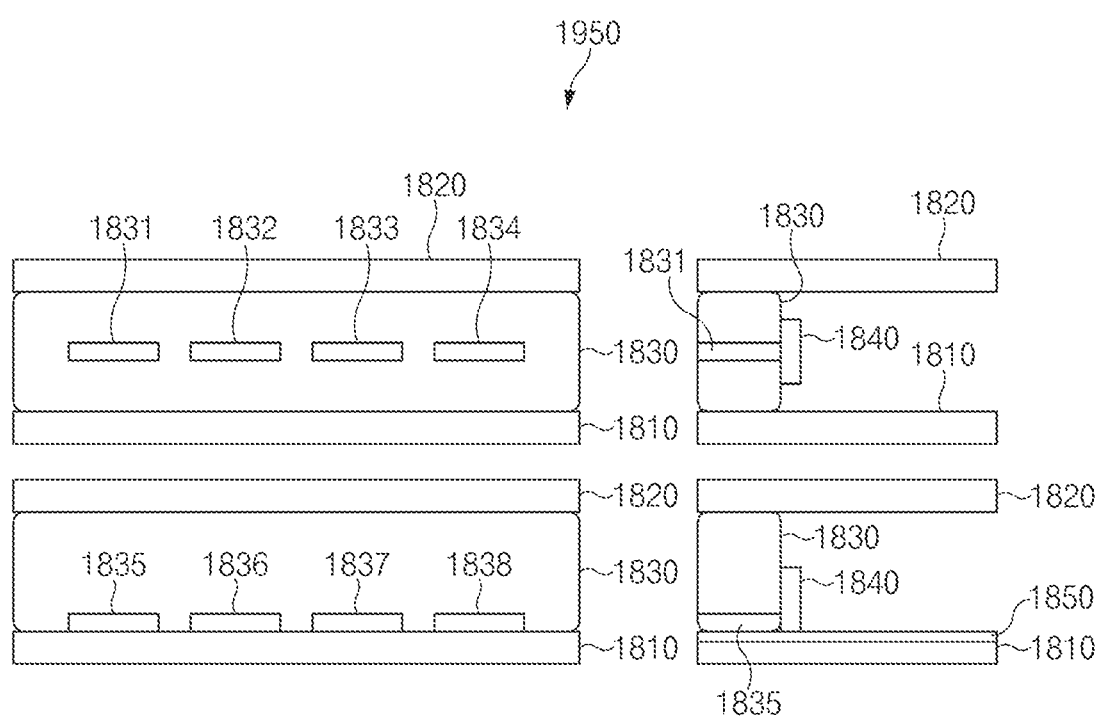
FIG. 19B is a view illustrating through-holes of an electronic device 101, according to an embodiment.

FIG. 19B is a view 1950 illustrating through-holes 1831 to 1838 of the electronic device 101, according to an embodiment.

In an embodiment, the electronic device 101 may include a first glass layer 1810, a second glass layer 1820, a conductive layer 1830, and/or a printed circuit board 1840. The conductive layer 1830 may be interposed between the first glass layer 1810 and the second glass layer 1820.

In an embodiment, the conductive layer 1830 may include the plurality of through-holes 1831 to 1838. For example, the plurality of through-holes 1831 to 1834 may be disposed at a central portion of the conductive layer 1830. For another example, the plurality of through-holes 1835 to 1838 may be disposed in a peripheral region of the conductive layer 1830, which is close to the first glass layer 1810 rather than the second glass layer 1820.

In an embodiment, the plurality of through-holes 1831 to 1838 may be implemented with slots. At least some through-holes or slots may be replaced with a conductive layer 1850 separately provided on the first glass layer 1810 or the second glass layer 1820. For example, the conductive layer 1850 may be implemented on the first glass layer 1810. For another example, the conductive layer 1850 may be implemented between the first glass layer 1810 and an inner structure. For another example, the conductive layer 1850 may be implemented on an inner structure separately from the first glass layer 1810. The conductive layer 1850 may be formed to surround the plurality of through-holes 1831 to 1838. For example, as illustrated in FIG. 19B, the conductive layer 1850 may be formed between the through-holes 1835 to 1838 and the first glass layer 1810 so as to at least partially cover openings of the through-holes 1835 to 1838.

Figure 20:
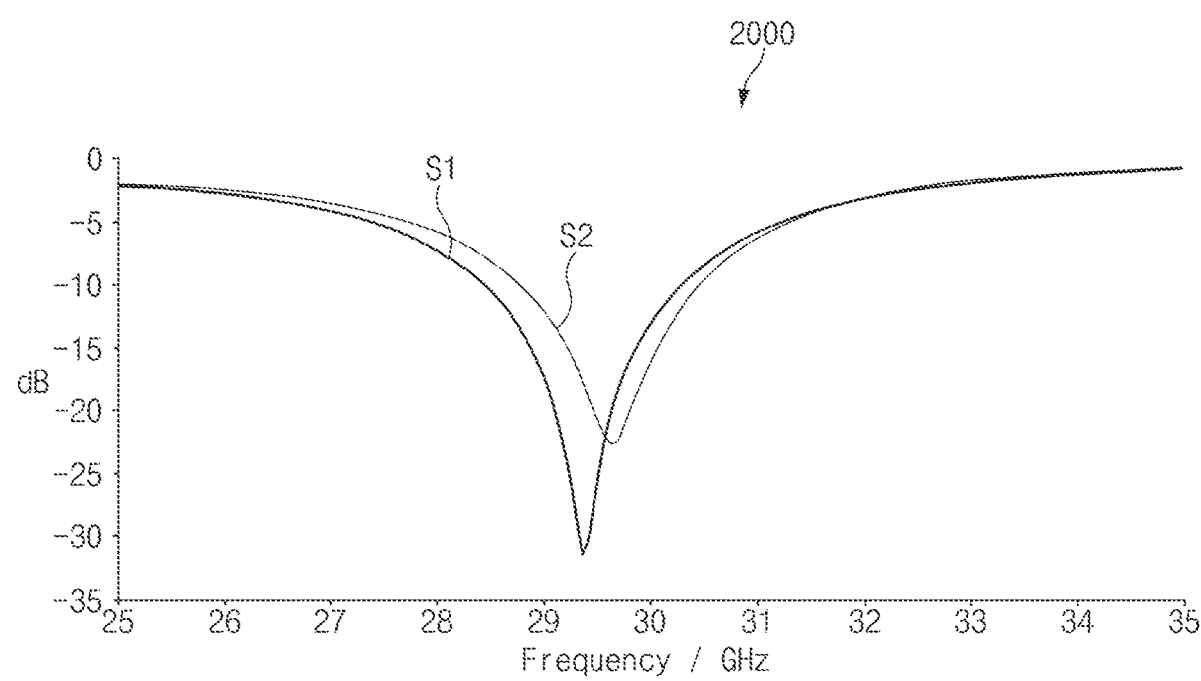
FIG. 20 is a graph illustrating an impedance bandwidth characteristic of an antenna structure, according to an embodiment.

FIG. 20 is a graph 2000 illustrating an impedance bandwidth characteristic of an antenna structure, according to an embodiment.

In an embodiment, a result of measuring and/or simulating an S-parameter for a 1×4 antenna structure in which four through-holes of a radiator of a straight-type through-hole or slot shape are arranged in line may be illustrated. An impedance characteristic of a radiator or a feeding part may be confirmed in the case of measuring the S-parameter.

In an embodiment, a first S-parameter S1 marked by a bold line may be a reflection coefficient (S11) characteristic of each of two through-holes disposed at opposite left and right edges from among four through-holes. A reflection coefficient characteristic of a through-hole disposed at the left edge may be substantially identical to a reflection coefficient characteristic of a through-hole disposed at the right edge.

In an embodiment, a second S-parameter S2 marked by a thin line may be a reflection coefficient (S11) characteristic of each of two through-holes disposed at a central portion from among the four through-holes. Reflection coefficient characteristics of the two through-holes disposed at the central portion may be substantially identical.

In an embodiment, in the case where a plurality of conductive paths connecting a radiator and a feeding part are disposed dually toward the radiator, an impedance characteristic of the radiator or the feeding part may be adjusted.

In an embodiment, a reflection coefficient characteristic of the radiator according to a frequency may be adjusted in the case of adjusting an impedance characteristic of the radiator or the feeding part. For example, in the case where a reflection coefficient is 10 dB or less at a specified frequency, a signal may be transmitted and/or received without distortion. In the case where a reflection coefficient characteristic is adjusted like the bold line of FIG. 20, a signal in a frequency band of about 28 GHz or higher and about 38.8 GHz or lower may be transmitted and/or received. Accordingly, wideband transmission and reception characteristics of an antenna structure may be secured.

Figure 21:
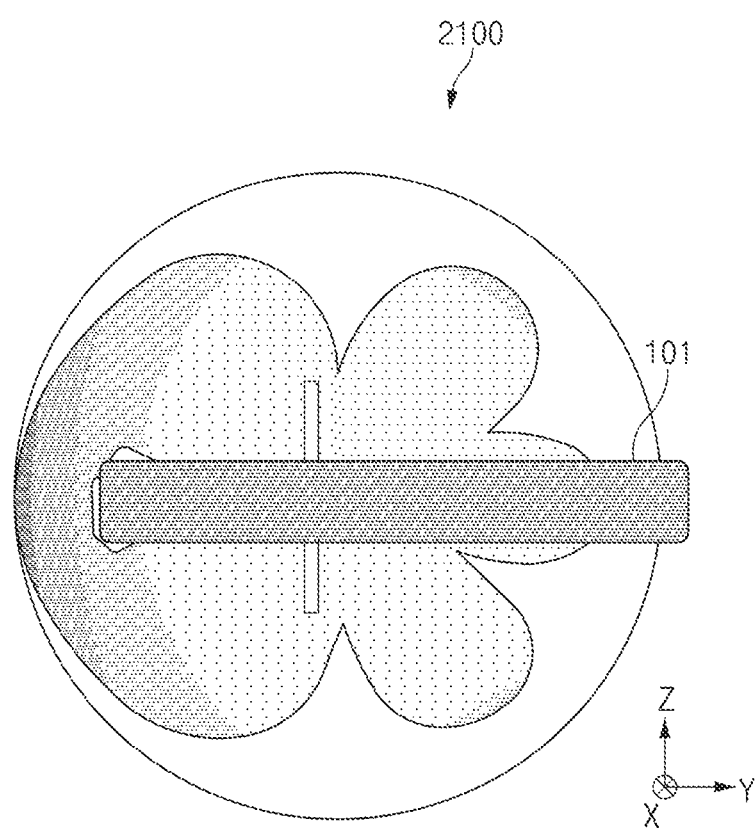
FIG. 21 is a graph illustrating a gain characteristic of an antenna structure, according to an embodiment.

FIG. 21 is a graph 2100 illustrating a gain characteristic of an antenna, according to an embodiment.

In an embodiment, the electronic device 101 may include a plurality of through-holes or slots on one side thereof. For example, a radiation pattern may be measured and/or simulated in a state where a plurality of through-holes or slots are formed in a +Y-axis direction or at an upper end. FIG. 21 may indicate a measurement and/or simulation result of the electronic device 101 when viewed in a −X-axis direction.

In an embodiment, the plurality of through-holes or slots may have a straight-type 1×4 through-hole or slot structure illustrated in FIG. 5A or 19B. The plurality of through-holes or slots may form a vertical polarization component. FIG. 21 is a side view of the whole radiation pattern of a 1×4 array including the plurality of through-holes or slots.

In an embodiment, in the case of feeding signals to a radiator by using a plurality of conductive paths, it may be possible to increase a gain characteristic of an antenna structure in a radiation direction. For example, it is confirmed from FIG. 21 that a radiation pattern increases in the Y-axis direction.

In an embodiment, in the case where the plurality of conductive paths are fed to be symmetrical with respect to the center of the radiator, a radiation pattern of a signal may be formed symmetrically. For example, it is confirmed from FIG. 21 that a radiation pattern is symmetrical with respect to the Y-axis.

Figure 22:
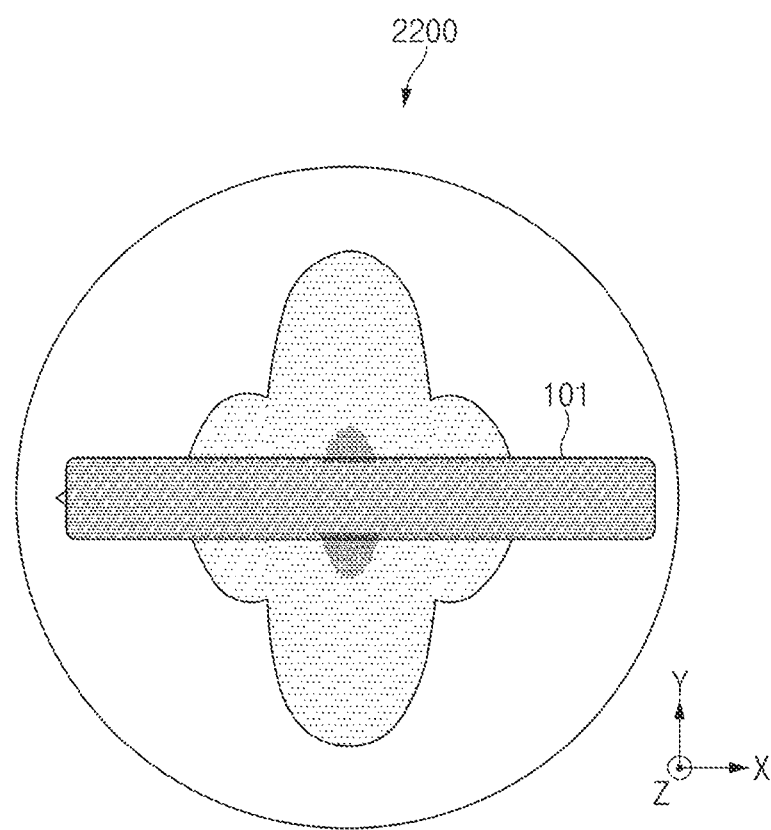
FIG. 22 is a graph illustrating a radiation pattern of an antenna structure, according to an embodiment.

FIG. 22 is a graph 2200 illustrating a radiation pattern of an antenna structure, according to an embodiment.

FIG. 22 may indicate a measurement and/or simulation result of the electronic device 101 when viewed in a +y-axis direction.

In an embodiment, a plurality of through-holes or slots may have a straight-type 1×4 through-hole or slot structure illustrated in FIG. 5A or 19B. The plurality of through-holes or slots may form a vertical polarization component. FIG. 22 is a front view of the whole radiation pattern of a 1×4 array including the plurality of through-holes or slots.

In an embodiment, in the case of feeding signals to a radiator by using a plurality of conductive paths, it may be possible to increase a gain characteristic of an antenna structure in a radiation direction. For example, it is confirmed from FIG. 22 that a radiation pattern increases in the Z-axis direction.

In an embodiment, in the case where the plurality of conductive paths are fed to be symmetrical with respect to the center of the radiator, a radiation pattern of a signal may be formed symmetrically. For example, it is confirmed from FIG. 22 that a radiation pattern is symmetrical with respect to the Z-axis.

An electronic device (101) according to various embodiments may include a housing that includes a first plate (e.g., the first plate 1540 of FIG. 15A), a second plate (e.g., the second plate 1550 of FIG. 15A) facing away from the first plate (1540), and a side member (e.g., the side member 1560 of FIG. 15A) surrounding a space between the first plate (1540) and the second plate (1550), connected with the second plate (1550) or integrally formed with the second plate (1550), and including a first portion (e.g., the first portion 510 of FIG. 5A) including a conductive material, wherein the first portion (510) of the side member (1560) includes a plurality of through-holes (e.g., the plurality of through-holes 512, 514, 516, and 518 of FIG. 5A) arranged in a first direction (e.g., the X-axis direction of FIG. 5A) substantially parallel to the first plate (1540), and a non-conductive material in the through-holes (512, 514, 516, 518), a structure (e.g., the antenna structure 500 of FIG. 5A) that is disposed in the space so as to face the through-holes (512, 514, 516, 518) and includes at least one conductive path (e.g., the first to twelfth paths 522, 524, 526, 528, 532, 534, 536, 538, 542, 544, 546, and 548 of FIG. 5A), and a wireless communication circuit (e.g., the RFIC 560 of FIG. 5A) that is electrically connected with the conductive path (e.g., the first to twelfth paths 522, 524, 526, 528, 532, 534, 536, 538, 542, 544, 546, and 548 of FIG. 5A).

In an embodiment, the through-holes (e.g., the plurality of through-holes 910 and 920 of FIG. 9) may include a cross shape.

In an embodiment, the through-holes (512, 514, 516, 518) may be elongated in the first direction (i.e., an X-axis direction).

In an embodiment, the conductive path (522, 524, 526, 528, 532, 534, 536, 538, 542, 544, 546, 548) may include a first path (542, 544, 546, 548), a second path (522, 524, 526, 528) that is extended from one end of the first path (542, 544, 546, 548), and a third path (532, 534, 536, 538) that is extended from the one end of the first path (542, 544, 546, 548) and is spaced from the second path (522, 524, 526, 528).

In an embodiment, connection parts (e.g., the connection parts (552, 554, 556, 558) of FIG. 5A) of the first path (542, 544, 546, 548) may be connected with the wireless communication circuit 560.

In an embodiment, when viewed from the outside of the through-holes (512, 514, 516, 518), a portion of the second path (522, 524, 526, 528) and a portion of the third path (532, 534, 536, 538) may overlap one of the through-holes (512, 514, 516, 518).

In an embodiment, the portion of the second path (522, 524, 526, 528) may be extended in a second direction substantially perpendicular to the first direction (i.e., an X-axis direction), and the portion of the third path (532, 534, 536, 538) may be extended in the second direction (i.e., a Y-axis direction).

In an embodiment, the electronic device may further include a first conductive pattern (e.g., the open stub 621 of FIG. 6) connected with an end portion of the second path (522, 524, 526, 528), and a second conductive pattern (e.g., the open stub 631 of FIG. 6) connected with an end portion of the third path (532, 534, 536, 538).

An electronic device (101) according to various embodiments may include a housing that includes a side member (1560), a radiator (e.g., the plurality of through-holes 512, 514, 516, and 518 of FIG. 5B) that is formed at a first portion (510) of the side member (1560), the first portion (510) including a conductive material, and a plurality of feeding parts (e.g., the plurality of feeding parts 572, 574, 576, and 578 of FIG. 5B) that feed the radiator. The radiator (512, 514, 516, 518) may include a plurality of through-holes (512, 514, 516, 518) disposed in a slot form, and a non-conductive material disposed in the through-holes (512, 514, 516, 518). Each of the plurality of feeding parts (572, 574, 576, 578) may include a plurality of conductive paths (522, 524, 526, 528, 532, 534, 536, 538, 542, 544, 546, 548), and at least two conductive paths (522, 532) among the plurality of conductive paths (522, 524, 526, 528, 532, 534, 536, 538, 542, 544, 546, 548) may be disposed to partially overlap the same through-hole (512).

In an embodiment, the at least two conductive paths (522, 532) disposed to partially overlap the same through-hole (512) may transfer in-phase signals to the same through-hole (512).

In an embodiment, the electronic device may further include a wireless communication circuit (e.g., the wireless communication circuit 940 of FIG. 8B) including a plurality of power amplifiers (PA) (e.g., the first to eighth power amplifiers 842, 844, 846, 848, 852, 854, 856, and 858 of FIG. 8B), and the plurality of power amplifiers (842, 844, 846, 848, 852, 854, 856, 858) may be respectively connected with the plurality of conductive paths (522, 524, 526, 528, 532, 534, 536, 538, 542, 544, 546, 548).

In an embodiment, each of the plurality of through-holes (e.g., the plurality of through-holes 910 and 920 of FIG. 9) may include a first slit (e.g., the first slit 1210 of FIG. 12) that is extended in a first direction (i.e., an X-axis direction)

being a direction in which the plurality of through-holes (910, 920) are arranged, and a second slit (e.g., the second slit 1220 of FIG. 12) that is extended in a second direction (i.e., a Y-axis direction) perpendicular to the first direction (i.e., an X-axis direction), and the first slit (1210) and the second slit (1220) may be fed by using different feeding parts (e.g., the feeding parts 1262 and 1272 of FIG. 12A).

In an embodiment, the different feeding parts (1262, 1272) may further include a first feeding part (1262) overlapping the first slit (1210), and a second feeding part (1272) overlapping the second slit (1220), and the first feeding part (1262) and the second feeding part (1272) may feed signals polarized in different phases.

In an embodiment, each of the plurality of through-holes (e.g., the plurality of through-holes 1010 and 1020 of FIG. 10) may include a third slit (e.g., the fifth slit 1012 of FIG. 10) that is extended in a first direction (i.e., an X-axis direction) being a direction in which the plurality of through-holes (1010, 1020) are arranged or in a third direction (e.g., direction D3 of FIG. 10) being a direction different from a second direction (i.e., a Y-axis direction) perpendicular to the first direction (i.e., an X-axis direction), and a fourth slit (e.g., the sixth slit 1014 of FIG. 10) that is extended in a fourth direction (e.g., direction D4 of FIG. 10) perpendicular to the third direction (D3), and the third slit (1012) and the fourth slit (1014) are fed by using different feeding parts (1262, 1272).

In an embodiment, the third slit (1012) and the fourth slit (1014) may form an angle of 45 degrees with a direction (i.e., an X-axis direction) in which the plurality of through-holes (1010, 1020) are arranged, and the third slit (1012) and the fourth slit (1014) may be fed with signals polarized to have a phase difference of 90 degrees.

An electronic device (101) according to various embodiments may include a housing that includes a first plate (1540), a second plate (1550) facing away from the first plate (1540), and a side member (1560) surrounding a space between the first plate (1540) and the second plate (1550), and is connected with the second plate (1550) or is integrally formed with the second plate (1550), and a printed circuit board (e.g., the substrate 550 of FIG. 5B) that is disposed in the space. The housing may include a first portion (510) including a conductive material. The first portion may include a plurality of through-holes (512, 514, 516, 518), and at least one conductive path (522, 524, 526, 528, 532, 534, 536, 538, 542, 544, 546, 548) disposed to face the through-holes (512, 514, 516, 518). The conductive path (522, 524, 526, 528, 532, 534, 536, 538, 542, 544, 546, 548) may include a first path (542, 544, 546, 548) facing the plurality of through-holes (512, 514, 516, 518), a second path (522, 524, 526, 528), and a third path (532, 534, 536, 538) which are branched and extended from the first path (542, 544, 546, 548) and at least partially overlapping the plurality of through-holes (512, 514, 516, 518). The first path (542, 544, 546, 548) may be fed from a feeding part (e.g., the plurality of feeding parts (572, 574, 576, 578) of FIG. 5B) included in the printed circuit board (550). The second path (522, 524, 526, 528) and the third path (532, 534, 536, 538) may feed the plurality of through-holes (512, 514, 516, 518).

In an embodiment, the plurality of through-holes (e.g., the plurality of through-holes 910 and 920 of FIG. 9) may include a first slit (912), and a second slit (914) disposed to be perpendicular to the first slit (912). The printed circuit board (550) may include a first feeding part (e.g., the first feeding part 1162 of FIG. 11B) that is disposed in a first layer (e.g., the first layer 1140 of FIG. 11B) and at least partially overlaps the first slit (912), and a second feeding part (e.g., the fifth feeding part 1172 of FIG. 11B) that is disposed in a second layer (e.g., the second layer 1150 of FIG. 11B) spaced from the first layer 1140 and at least partially overlaps the second slit (914).

In an embodiment, the plurality of through-holes (e.g., the plurality of through-holes 1010 and 1020 of FIG. 10) may form an angle of 45 degrees with an edge of the side member (1560).

In an embodiment, frequencies of signals radiated from the first slit (e.g., the ninth slit 1312 of FIG. 13) and the second slit (e.g., the tenth slit 1314 of FIG. 13) may be different.

In an embodiment, the at least one conductive path (522, 524, 526, 528, 532, 534, 536, 538, 542, 544, 546, 548) may be disposed at the printed circuit board (e.g., the printed circuit board 1610 of FIG. 16) where the plurality of through-holes (512, 514, 516, 518) are disposed, or may be disposed on at least one surface of a connection member (e.g., the connection member 1740 of FIG. 17) connecting the printed circuit board (1610) and a wireless communication circuit (e.g., the third RFIC 226 of FIG. 16) or in the connection member (1740).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing including a first plate, a second plate facing away from the first plate, and a side member surrounding a space between the first plate and the second plate, connected with the second plate or integrally formed with the second plate, and including a first portion including a conductive material, wherein the first portion of the side member includes:
a plurality of through-holes arranged in a first direction substantially parallel to the first plate;
a structure disposed in the space so as to face the through-holes and including a plurality of feeding parts; and
a wireless communication circuit electrically connected with the plurality of feeding parts,
wherein each of the plurality of through-holes includes:
a first slit extended in a third direction being different from the first direction or a second direction perpendicular to the first direction; and
a second slit extended in a fourth direction perpendicular to the third direction, and wherein the plurality of feeding parts includes:
a first feeding part overlapping the first slit and extended in the fourth direction; and
a second feeding part overlapping the second slit and extended in the third direction, wherein each of the first feeding part and the second feeding part includes:
a plurality of conductive paths including a first path, a second path, and a third path; and
a slit of a triangle form disposed at a junction at which the first path is coupled with the second path and the third path.

2. The electronic device of claim 1, wherein the first feeding part is disposed in a first layer; and
the second feeding part is disposed in a second layer beneath the first layer.

3. The electronic device of claim 2,
wherein the second path is extended from one end of the first path;
wherein the third path is extended from the one end of the first path and spaced from the second path, and
wherein connection parts of the first path are connected with the wireless communication circuit.

4. The electronic device of claim 3, further comprising:
a first conductive pattern connected with an end portion of the second path; and
a second conductive pattern connected with an end portion of the third path.

5. The electronic device of claim 3,
wherein a line width of the first path increases as a distance from one side at which the first path is coupled with the second path and the third path decreases.

6. An electronic device comprising:
a housing including a side member;
a radiator formed at a first portion of the side member, the first portion including a conductive material; and
a plurality of feeding parts configured to feed the radiator,
wherein the radiator includes:
a plurality of through-holes disposed in a slot form and arranged in a first direction,
wherein each of the plurality of feeding parts includes a plurality of conductive paths, and
wherein at least two feeding parts among the plurality of feeding parts are disposed to partially overlap the same through-hole,
wherein each of the plurality of through-holes includes:
a first slit extended in a third direction being different from the first direction or a second direction perpendicular to the first direction; and
a second slit extended in a fourth direction perpendicular to the third direction, and wherein the at least two feeding parts include:
a first feeding part overlapping the first slit and extended in the fourth direction; and a second feeding part overlapping the second slit and extended in the third direction, wherein each of the first feeding part and the second feeding part includes:
a plurality of conductive paths including a first path, a second path, and a third path; and
a slit of a triangle form disposed at a junction at which the first path is coupled with the second path and the third path.

7. The electronic device of claim 6, wherein the at least two feeding parts disposed to partially overlap the same through-hole transfer in-phase signals to the same through-hole.

8. The electronic device of claim 7, further comprising:
a wireless communication circuit including a plurality of power amplifiers,
wherein the plurality of power amplifiers are respectively electrically connected with the plurality of conductive paths.

9. The electronic device of claim 6, wherein the first feeding part is disposed in a first layer,
wherein the second feeding part is disposed in a second layer beneath the first layer, and
wherein the first feeding part and the second feeding part feed signals polarized in different phases.

10. The electronic device of claim 6, wherein the first slit and the second slit are fed by using different feeding parts.

11. The electronic device of claim 6, wherein the first slit and the second slit form an angle of 45 degrees with the first direction in which the plurality of through-holes are arranged, and
wherein the first slit and the second slit are fed with signals polarized to have a phase difference of 90 degrees.

* * * * *